(12) United States Patent
Toda

(10) Patent No.: US 6,256,107 B1
(45) Date of Patent: *Jul. 3, 2001

(54) IMAGE FORMING SYSTEM INCLUDING INTERCONNECTED AND PRIORITY ALLOCATED IMAGE FORMING DEVICES

(75) Inventor: Rieko Toda, Yamatokoriyama (JP)

(73) Assignee: Sharp Kabushiki Kaisha, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,419

(22) Filed: May 29, 1998

(30) Foreign Application Priority Data

May 30, 1997 (JP) .................................................. 9-141441

(51) Int. Cl.$^7$ ...................................................... G06F 15/00
(52) U.S. Cl. ......................................... 358/1.15; 358/1.13
(58) Field of Search ............................... 358/1.1, 1.5, 1.6, 358/1.9, 1.12, 1.13, 1.14, 1.15, 1.18, 400, 403, 405, 407, 408, 409, 500, 501; 355/46, 89, 401; 709/200, 201, 202, 203, 205, 207, 244

(56) References Cited

U.S. PATENT DOCUMENTS

| | | | |
|---|---|---|---|
| 4,167,322 | 9/1979 | Yano et al. | 355/3 R |
| 4,583,834 | 4/1986 | Seko et al. | 355/14 C |
| 4,797,706 | 1/1989 | Sugishima et al. | 355/14 R |
| 4,843,571 | * 6/1989 | Notermans et al. | 358/1.18 |
| 5,051,779 | 9/1991 | Hikawa | 355/200 |
| 5,228,118 | * 7/1993 | Sasaki et al. | 358/1.13 |
| 5,287,194 | 2/1994 | Lobiondo | 358/296 |
| 5,339,168 | 8/1994 | Evanitsky et al. | 358/402 |
| 5,689,755 | * 11/1997 | Ataka | 399/8 |
| 5,727,135 | * 3/1998 | Webb et al. | 358/1.14 |
| 5,946,457 | * 8/1999 | Nakai et al. | 358/1.13 |
| 5,991,846 | * 11/1999 | Ooui | 710/241 |

FOREIGN PATENT DOCUMENTS 53-116834   10/1978   (JP) .

* cited by examiner

Primary Examiner—Dov Popovici
Assistant Examiner—Gabriel I. Garcia
(74) Attorney, Agent, or Firm—Dike, Bronstein, Roberts & Cushman, LLP; David G. Conlin; David A. tucker

(57) ABSTRACT

Communications devices connect a plurality of digital copying machines. One of the copying machines is used to search among the other copying machines for those whose processing functions match conditions and priorities regarding image processing, post-processing, size of paper, and functions set by the operator. Those machines that match the conditions and priorities set by the operator are registered as being capable of allocation processing operations. Thereafter, the current availability of the registered digital copying machines is checked, and an outputting job is allocated, and image data is transferred, to available ones of the digital copying machines, thereby causing them to perform an allocation processing operation. Therefore, by setting the conditions and priorities for obtaining hard copies as desired by the operator using one digital copying machine, the capable and available other digital copying machines are selected and caused to perform an allocation processing operation. Accordingly, the operator him/herself does not have to select manually and/or individually some from among the plurality of copying machines connected in a network defining an image forming system, and the burden upon the operator is reduced.

4 Claims, 15 Drawing Sheets

FIG. 8(a) MAIN SCREEN
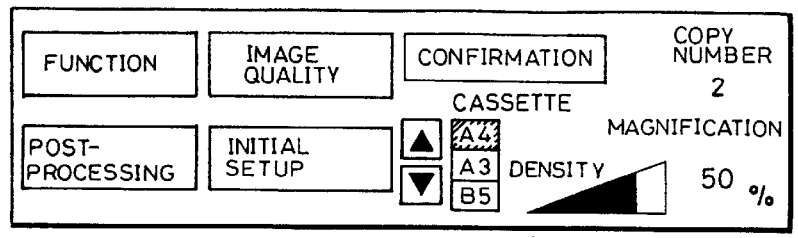
FIG. 8(b) FIRST FUNCTION SETUP SCREEN
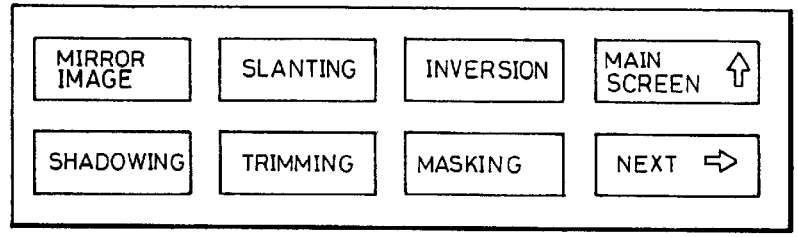
FIG. 8(c) SECOND FUNCTION SETUP SCREEN
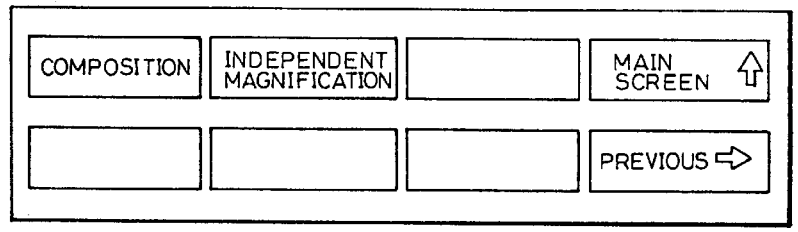
FIG. 8(d) IMAGE QUALITY SETTING SCREEN
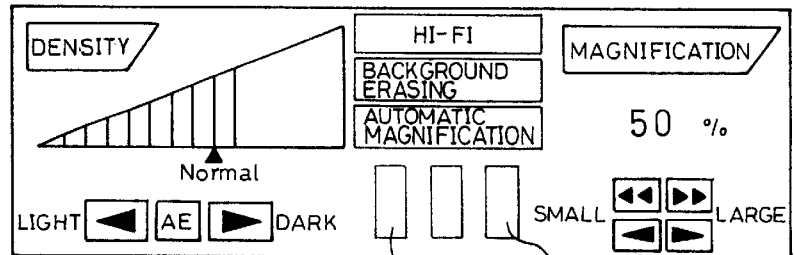
FIG. 8(e) POST-PROCESSING SCREEN
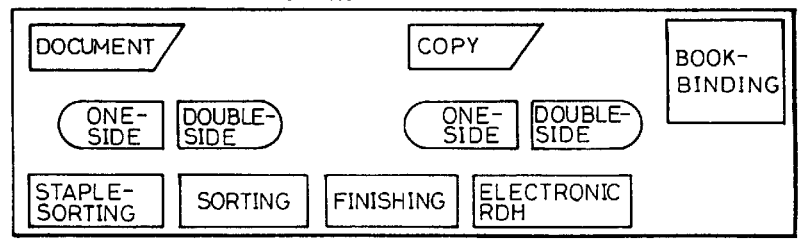
FIG. 8(f) SLANT SETTING SCREEN
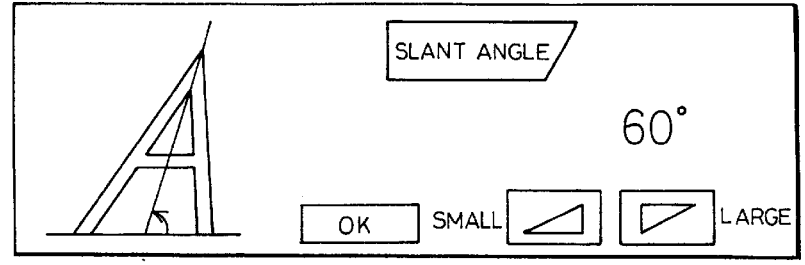

FIG.9(a) INITIAL SETUP SCREEN

| FINGER PRINT REGISTRATION | SECTION CONTROL | SIMULATION | MAIN SCREEN ⇧ |
|---|---|---|---|
| MAINTENANCE | FUNCTION REGISTRATION | OUTPUT UNIT SELECT | |

FIG.9(b) FINGER PRINT REGISTRATION SCREEN

INPUT SECTION AND NAME OF REGISTRANT AND PRESS COPY BUTTON

SECTION CODE      NAME      OK

A B C D E F G H I J K L M N O P Q R S T U V
W X Y Z   0 1 2 3 4 5 6 7 8 9   SPASE   BS

FIG.9(c) SECTION CONTROL SCREEN

SECTION CONTROL                              ON   OFF

| SECTION CODE | NUMBER OF PERSONNEL | TOTAL NUMBER | LIMITER(SHEETS) |
|---|---|---|---|
| ①00001 | 5 | 90 | 200 |
| ②00002 | 8 | 100 | 300 |
| ③00003 | 2 | 53 | 100 |

OUTPUT   LIMITER SETTING   NEXT   OK

FIG.9(d) LIMITER SETTING SCREEN

LIMITER SETTING

SECTION CODE      LIMITER(SHEETS)
① 00001           200

▼ ▲   0 2 3 4 5 6 7 8 9 ∞      OK

FIG.9(e) SIMULATION SCREEN

| DATA READING | TROUBLE CHECK | ADJUSTMENT | MAIN SCREEN ⇧ |
|---|---|---|---|
| COUNTER RESET | DOCUMENT PROCESSING MODE SETTING | | |

IMAGE FORMING SYSTEM INCLUDING INTERCONNECTED AND PRIORITY ALLOCATED IMAGE FORMING DEVICES

FIELD OF THE INVENTION

The present invention relates to an image forming system composed of a plurality of image forming devices which are connected with each other so that they reciprocally send/receive image data and the like through communication means, and particularly relates to an image forming system arranged so that an outputting job is allocated through a sole certain image forming device to other image forming devices of the image forming system.

BACKGROUND OF THE INVENTION

A digital copying machine reads an image of a document on its own, processes data of the image thus read (image information) under appropriately set conditions, and reproduces the image on a sheet of paper so as to output the image in a form of a hard copy.

There is an image forming system in which the digital copying machine is connected with a plurality image input devices through communication lines so that image data sent from the image input devices are reproduced and outputted in a form of a hard copy by the digital copying machine. Such an image forming system may include, other than the digital copying machine, a facsimile machine, a personal computer, a printer, a scanner, and the like.

For example, the Japanese Publication for Laid-Open Patent Application No. 53-116834/1978 (Tokukaisho 53-116834) discloses an image forming system in which a plurality of image reading devices and a plurality of image forming devices for reproducing image data are interconnected so as to transmit information. In the foregoing image forming system, image data read by the image reading device are transmitted to the image forming device through a single control unit, and the image data are reproduced by the image forming device receiving the image data. Thus, the image data read by one certain image reading device (scanner) are transferred to one certain image forming device, and the image data are reproduced and outputted in a form of a hard copy by the image forming device.

The Japanese Examined Patent Publication No. 7-36592/1995 (Tokukohei 7-36592) discloses an image forming system in which a plurality of image forming devices each of which is equipped with an image reading device, an image processing unit, and an image forming unit are interconnected through communication means. In the foregoing image forming system, a set of image data to be reproduced is transmitted to the plural image forming devices interconnected with each other in the image forming system, so that the outputting job of the image data is allocated to the image forming devices in accordance with a set document image copy mode (copy mode), whereby the outputting of the image data in a form of a hard copy is performed by the image forming devices in parallel.

Such a conventional image forming system as described above, in producing hard copies, provides an advantage that an outputting time is reduced, since a necessary number of image forming devices are utilized and a job of producing a set number of copies is allocated to the image forming devices. However, in the case where a digital copying machine is adapted to be used as the foregoing image forming device, the following problems arise.

For example, in the case where other copying machines do not have a function for image processing now requested, an unexpected output is sometimes obtained when attempting to obtain the output in a hard copy form by utilizing the copying machines and allocating the outputting job to the copying machines. Besides, the conventional image forming system does not have means for informing an operator of a current output state, and hence, when such unexpected output is made, the operator cannot know it.

Furthermore, the greatest advantage of the output job allocation is that a job length, that is, a time for outputting operation is reduced, but this is not fully taken into consideration in the case of the conventional image forming system.

SUMMARY OF THE INVENTION

The object of the present invention is to provide an image forming system characterized in (1) having a network of a plurality of digital copying machines interconnected with each other, and (2) that burden borne by an operator is reduced in selecting a digital copying machine to which image data are allocated.

To achieve the above object, the image forming system of the present invention is characterized in comprising a first image forming device which an operator directly utilizes to set various conditions, and a plurality of second image forming devices connected with the first image forming device through a communication line, wherein the first image forming device includes a control section for searching the second image forming devices for any one capable of outputting in accordance with previously set conditions for outputting, allocating an outputting job and transferring image data to the second image forming device thus searched out so as to cause them to perform the allocated outputting job.

Since in the case where a large number of copies are to be produced, the foregoing system is capable of completing an outputting job by allocating it to the image forming devices connected through the communication line, an outputting time is shortened.

Here, the operator desirably sets conditions for outputting, including not only the number of copies to be produced but also formats outputted, by utilizing the first image forming device the operator directly uses. For example, the operator sets a magnification rate, image editing conditions, and the like. The first image forming device searches a plurality of the image forming devices interconnected for those capable of outputting in accordance with the set conditions, and transfers image data to the image forming devices thus searched out.

By doing so, output the operator desires can be obtained from the second image forming devices to which the outputting job is allocated, and output the operator does not desire never occurs. Besides, since the operator merely sets the conditions in order to obtain desired output, the burden borne by the operator decreases.

Another image forming system to achieve the aforementioned object is characterized in comprising a first image forming device which an operator directly utilizes to set various conditions, and a plurality of second image forming devices connected with the first image forming device through a communication line, wherein the first image forming device includes (1) a control section for searching the second image forming devices and selecting any ones capable of outputting in accordance with previously set conditions for outputting, (2) a display section for displaying information about the selected second image forming devices, and (3) a setting section for allowing the operator to arbitrarily select any ones to be used for performing the outputting operation from among the selected second image forming devices, referring to the displayed information, wherein the control section allocates an outputting job, and transfers image data to the second image forming devices thus selected so as to cause them to perform the allocated outputting job.

With the foregoing image forming system, the processing efficiency is further enhanced since the operator is allowed to select image forming devices which are the most convenient for the operator. For example, in the case where the second image forming devices selected by the control section include one placed at a remote location from the first image forming device, the operator can exclude the second image forming device at the remote location from a list of the selected second image forming devices. By doing so, the operator does not have to go to a remote location to fetch the hard copies.

Furthermore, in the case where the selected second image forming devices have image processing functions the operator further desires, the operator is allowed to further requests image processing by such functions. In other words, the image processing functions of the selected image forming devices can be fully utilized, whereby an output in a format the operator further desires can be achieved.

Still another image forming system to achieve the aforementioned object is characterized in comprising a first image forming device which an operator directly utilizes to set various conditions, and a plurality of second image forming devices connected with the first image forming device through a communication line, wherein (1) the first image forming device includes a control section for searching the second image forming devices for any one capable of outputting in accordance with previously set conditions for outputting, allocating an outputting job, and transferring image data to the second image forming device thus searched out so as to cause it to perform the allocated outputting job, and (2) in case additional image data are inputted during performing the allocated outputting job or immediately after finishing the same, the control section transfers the additional image data to the image forming devices performing or finishing the allocated outputting job, without performing the searching operation.

With the foregoing image forming system, the processing efficiency is further enhanced, since the image forming devices which have perform an outputting operation can be made to remain in use, to output the additional image data. Besides, there is no burden on the operator, since just an instruction for the additional processing is required.

For a fuller understanding of the nature and advantages of the invention, reference should be made to the ensuing detailed description taken in conjunction with the accompanying drawings.

BRIEF DESCRIPTION OF THE DRAWINGS

FIGS. 8(a) through 8(f) are plan views illustrating examples of display images appearing on a display screen in the shifting process shown in FIG. 7. FIG. 8(a) illustrates a main screen of the LCD device, FIG. 8(b) illustrates a first function setup screen of the LCD device, FIG. 8(c) illustrates a second function setup screen of the LCD device, 8(d) illustrates an image quality screen of the LCD device, FIG. 8(e) illustrates a post-processing screen of the LCD device, and FIG. 8(f) illustrates a screen for slanting an image.

FIGS. 9(a) through 9(e) are plan views illustrating examples of display images appearing on a display screen in the shifting process shown in FIG. 7. FIG. 9(a) illustrates an initial setup screen of the LCD device, FIG. 9(b) illustrates a finger print registration screen of the LCD device, FIG. 9(c) illustrates a section control screen of the LCD device, FIG. 9(d) illustrates a limiter setting screen of the LCD device, and FIG. 9(e) illustrates a simulation setting screen of the LCD device.

DESCRIPTION OF THE PREFERRED EMBODIMENTS

Figure 1:
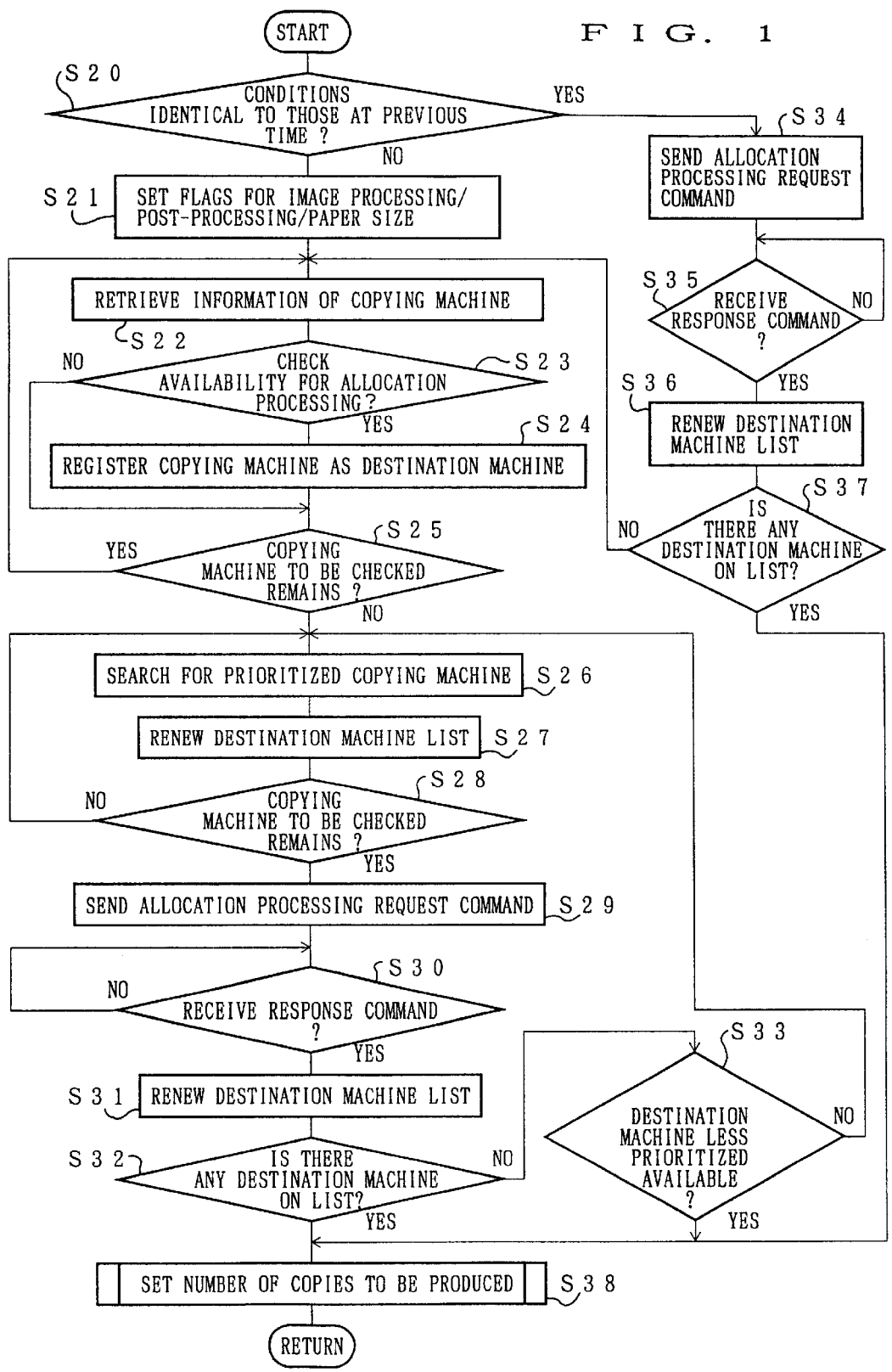
FIG. 1 is a flowchart of a control routine for setting a job allocating-processing operation which is a step in a process shown in FIG. 2, the control routine being in accordance with one embodiment of the present invention.

The following description will explain an embodiment of an image forming system of the present invention in detail, while referring to the drawings.

The image forming system of the present invention is composed of (1) an image input device for inputting image information supplied from outside, and (2) image forming devices, the image input device and the image forming devices being connected with each other. Particularly, an example of the image forming system wherein digital copying machines are used as the image forming devices is shown herein. In the present invention, however, the image forming device and the image input device may be separately provided, and any image forming device may be used provided that it is capable of outputting image data sent from the image input device, in a hard copy form.

Figure 3:
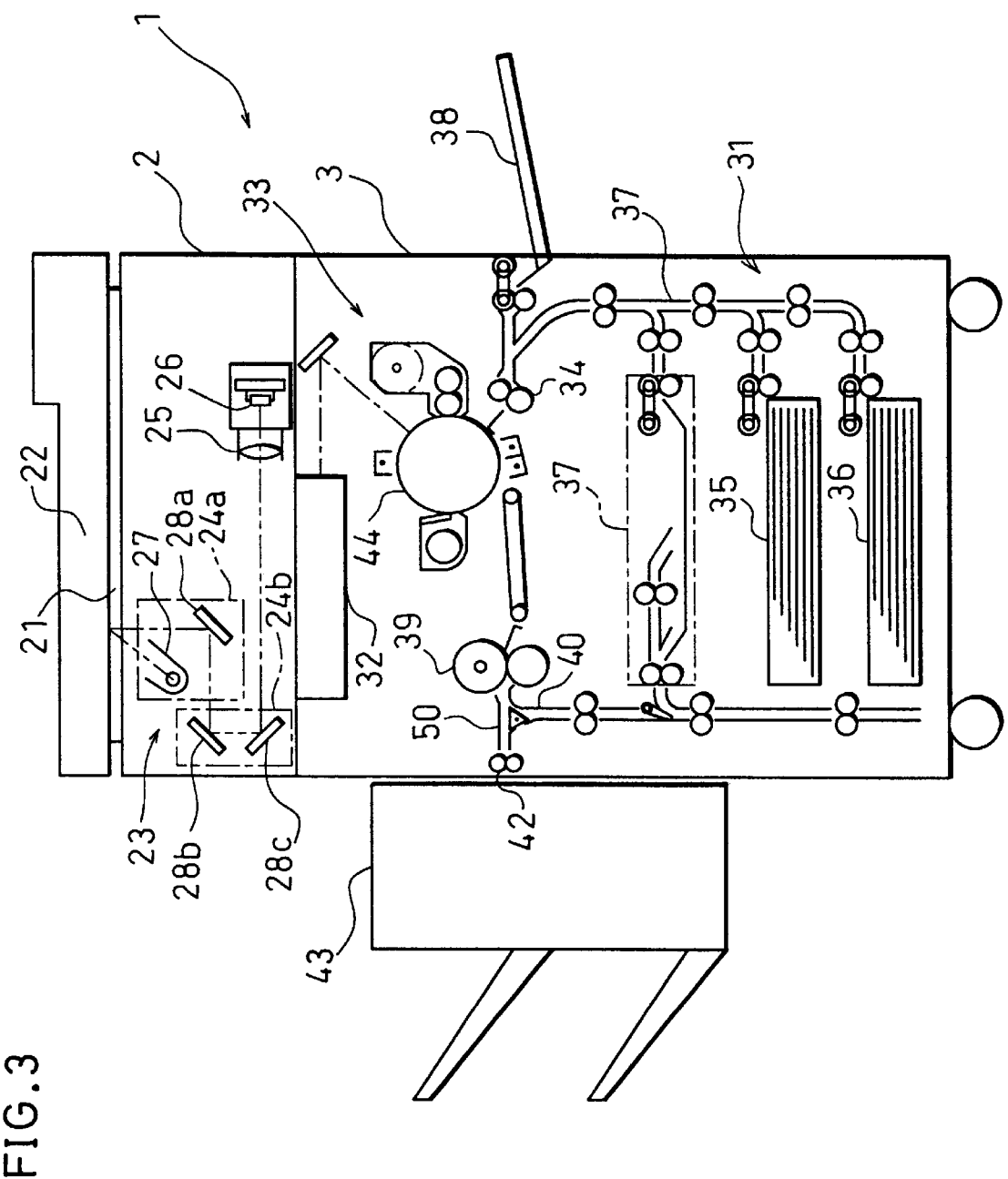
FIG. 3 is a cross-sectional view illustrating a schematic arrangement of a digital copying machine used as an image forming device which serves as a core of the image forming system of the present invention.

First of all, referring to FIG. 3, the following description will explain a digital copying machine 1 which is an image forming device serving as main output means of the present invention. A main body of the digital copying machine 1 is mainly composed of a scanner 2, and a laser recording unit, that is, a printer 3.

The scanner 2 comprises a document platen 21 made of transparent glass, a recirculating automatic document feeding device (hereinafter referred to as RADF) 22 which automatically transports the document onto the document platen 21, and a document image reading unit for scanning and reading the image of the document held on the document platen 21, that is, a scanner unit 23. Data of the image of the document read by the scanner unit 23 are sent to an image data input section which will be described layer, and a predetermined image processing operation is applied to the image data under conditions determined by the operator.

The RADF 22 includes a document storing tray on which a plurality of documents are set, and the document storing tray automatically feeds the documents one by one to the document platen 21 of the scanner unit 23. The RADF 22 also includes a transport path for a one-sided document, a transport path for a double-sided document, transport path switching means, a group of sensors for detecting and controlling a state of a document passing each section, a control unit, and the like, so as to cause the scanner unit 23 to read one side or both sides of a document in accordance with selection by the operator. Since many patent applications regarding RADFs have been filed and various RADFs have been commercialized, more detailed explanation about the RADF is omitted here.

The scanner unit 23 comprises a first scanning unit 24a, a second scanning unit 24b, an optical lens 25 through which reflected light from the document passes thereby creating an image, and a photoelectric converting element (hereinafter referred to as a CCD (charge-coupled device)) 26 for converting the image of the reflected light from the document into electric image signals. Note that the first scanning unit 24a is composed of a lamp reflector assembly 27 for irradiating a surface of the document and a first reflection mirror 28a for guiding the reflected light image from the document to the CCD 26, while the second scanning unit 24b is composed of second and third reflection mirrors 28b and 28c.

The scanner 2 causes the RADF 22 and the scanner unit 23 to act in an interlocked manner so that documents to be read are placed one by one on the document platen 21 while the scanner unit 23 moves along a lower surface of the document platen 21 so as to read the documents. More specifically, the first scanning unit 24a moves from left to right along the document platen 21 at a constant velocity V, while the second scanning unit 24b is controlled so as to move in parallel in the same direction at a velocity of V/2. By doing so, an image of the document on the document platen 21 is projected onto the CCD 26 one line by one line, whereby the image is read.

A set of read image data thus obtained by reading the document image by using the scanner unit 23 is sent to an image processing device which will be described later, and after being subjected to various processing operations, it is temporarily stored in a memory of the image processing device. Then, the image data stored in the memory are read in response to output commands, and are supplied to the printer 3. The printer 3 conducts output operations for forming an image on a recording sheet in accordance with the image data sent thereto.

The printer 3 is equipped with a transport system 31 for transporting a sheet of paper as a recording material on which an image is formed, a laser write unit 32, and an electrophotographic processing unit 33 for forming an image.

The transport system 31 comprises a resist roller 34 for transporting a sheet of paper P to a transfer position of the electrophotographic processing unit 33 at which a transfer unit is disposed, first and second paper feeding units 35 and 36 for transporting the sheet of paper P to the resist roller 34, a perfecting unit 37 for perfect printing, a manual paper feeding unit 38 for appropriately feeding a sheet of paper in a specific requested size, a fixing unit 39 for fixing an image, particularly a toner image, formed on the sheet of paper P after transfer, and a re-transport path 40 for transporting the sheet of paper P to the perfecting unit 37 so that another image is formed on a reverse side of the sheet of paper P after fixation. On a downstream side to the fixing unit 39, there is provided a post-processing unit 43 for receiving the sheet of paper P on which an image is formed, which has been transported thereto through a sheet ejecting path 41 and an ejecting roller 42, and applying a predetermined processing operation to the sheet of paper P.

The laser write unit 32 includes a semiconductor laser for projecting a laser beam in accordance with image data read by the scanner unit 23 or image data sent from an outer device, a polygon mirror for constant angular velocity deflection of the laser beam, and an f-θ lens for correcting the laser beam thus deflected at a constant angular velocity so that the laser beam is deflected at a constant angular velocity onto a photosensitive drum 44 of the electrophotographic processing unit 33.

The electrophotographic processing unit 33 has a charger, a developer, a transfer unit, a separator, a cleaning unit, and a charge removing unit, which are provided in this order around the photosensitive drum 44 in accordance with a known arrangement, and by controlling them, it forms an image on a sheet of paper.

In the digital copying machine 1, the laser write unit 32 causes the laser beam to scan a surface of the photosensitive drum 44 of the electrophotographic processing unit 33, thereby forming thereon an electrostatic latent image in accordance with image data read from the memory. The electrostatic latent image is visualized with toner by the developer. The toner image thus visualized on the surface of the photosensitive drum 44 is electrostatically transferred onto a surface of one side of a sheet of paper fed from any one of the aforementioned paper feeding units of the multi-tray paper feeding unit, that is, any one of the first or second paper feeding units 35 or 36, or the manual paper feeding unit 38. The toner image electrostatically transferred onto the sheet is fixed thereon by the fixing unit 39. The sheet on which the toner image is formed is ejected to the post-processing unit 43 through the sheet ejecting path 41 and the ejecting roller 42, or is transported to the perfecting unit 37 through the re-transport path 40.

(Explanation on Circuitry of the Image Processing Device)

The following description will explain an arrangement and functions of the image processing device of the digital copying machine 1, which processes readout document image information.

Figure 4:
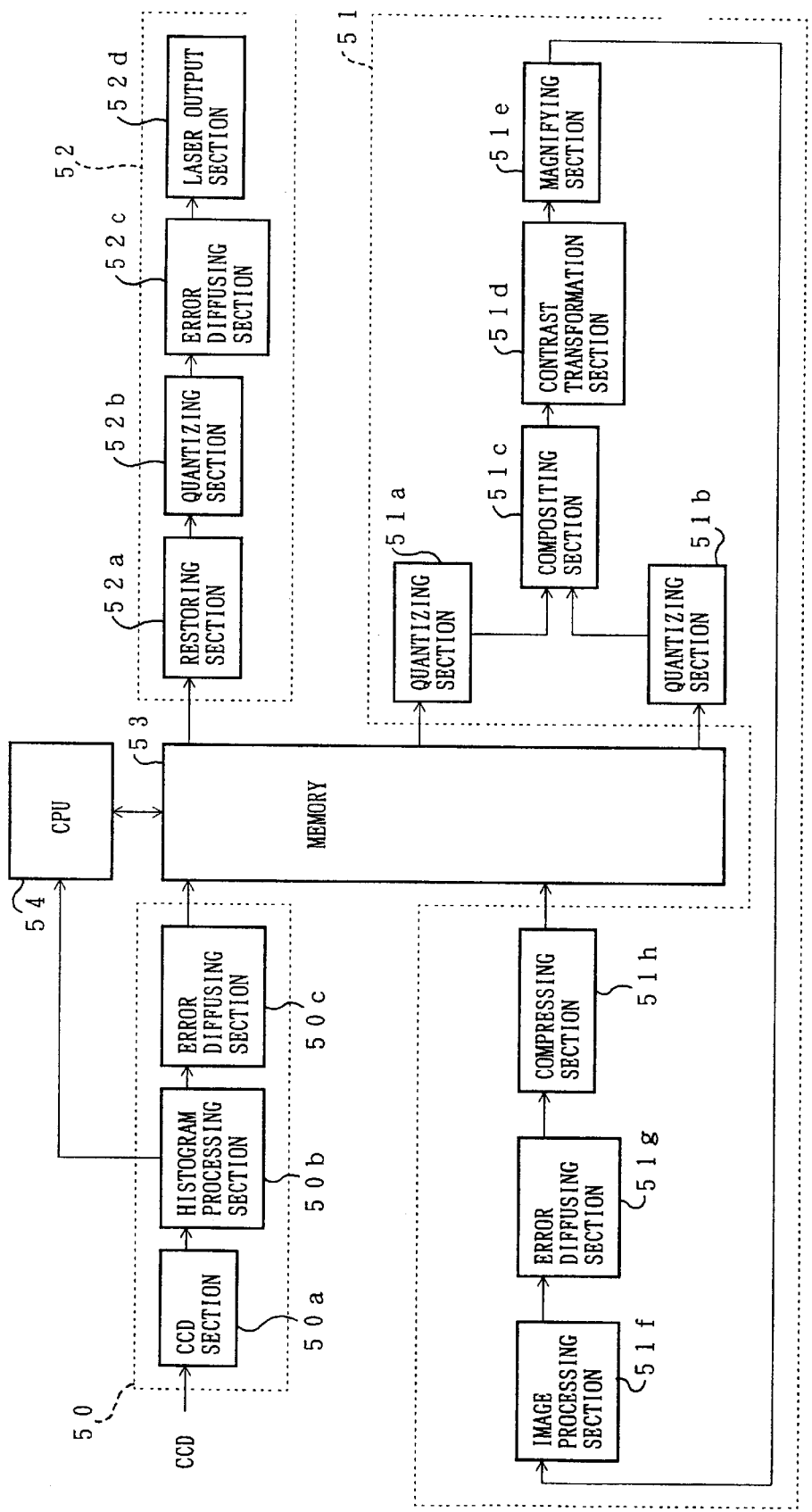
FIG. 4 is a block diagram illustrating details of an image processing unit for processing an image into such a state that it can be outputted by a printer provided in the digital copying machine shown in FIG. 3.

FIG. 4 is a block diagram of an image processing device installed in the digital copying machine 1 shown in FIG. 3. The image processing device comprises an image data input unit 50, an image processing unit 51, an image data output unit 52, a memory 53 composed of a RAM (random access memory), a hard disk, and the like, and a central processing unit (CPU) 54.

The image data input unit 50 includes a CCD section 50a, a histogram processing section 50b, and an error diffusing unit 50c. The image data input unit 50 processes the image data of the document which have been photoelectrically converted by the CCD 26 so as to become one-bit digital data, and processes the image data in the one-bit form by an error diffusing method while making a histogram. The image data thus processed are temporarily stored in the memory 53.

More specifically, in the CCD section 50a, analog electric signals representing the densities of pixels of the image data are converted into digital signals. The digital signals are then corrected by the MTF (modulation transfer function) correction, black-and-white level correction, or the gamma correction. Then, resultant 8-bit digital signals representing 256 tones are transferred to the histogram processing section 50b.

In the histogram processing section 50b, the digital signals outputted from the CCD section 50a are added according to each of pixel densities of 256 tones to obtain density information (histogram data). The histogram data thus obtained are sent to the CPU 54 when necessary, while the histogram data are sent as pixel data to the error diffusing unit 50c.

In the error diffusing unit 50c, the 8-bit/pixel digital signals outputted from the CCD section 50a are converted into 1-bit signals by the error diffusion method, and relocation is performed for faithfully reproducing the densities of local portions of the document. The error diffusing method is a type of pseudo-half-tone processing, and an error caused by the conversion to one bit is reflected in the conversion of an adjacent pixel data into one bit data.

The image processing unit 51 includes quantizing sections 51a and 51b, a compositing section 51c, a contrast transformation section 51d, a magnifying section 51e, an image processing section 51f, an error diffusing section 51g, and a compressing section 51h. The image processing unit 51 is a processing unit for finally converting the input image data into image data in a form desired by an operator, and it processes the image data until all the image data become in a desired final form as a result of conversion and thereafter they are stored in the memory 53. Note that the aforementioned processing sections included in the image processing unit 51 selectively function when necessary.

The quantizing sections 51a and 51b reconvert the image data which have been converted to one-bit data by the error diffusing section 50c, into data representing 256 tones.

The compositing section 51c selectively conducts a logical operation, that is, logical OR, AND, or exclusive OR operation, on each pixel. The data subjected to the operation are the pixel data stored in the memory 53 and bit data of pattern generator (PG).

In the contrast transformation section 51d, the relation between the output density and input density is determined according to a predetermined contrast transformation table with respect to the digital signals of 256 tones. Therefore, an image density according to the density requested by the operator can be outputted.

In the magnifying section 51e, interpolation and the like is performed based on the input known data according to an input magnification rate, so as to obtain pixel data (a density level) of pixels after magnification. In this interpolating operation, magnification processing is performed in a sub-scanning direction, then in a main scanning direction. By doing so, an image magnified at the magnification rate designated by the operator can be outputted.

In the image processing section 51f, various image processing operations are performed on the pixel data inputted thereto, and the collection of information about data strings, for example, extraction of features, is performed.

The error diffusing section 51g performs a processing operation similar to that conducted by the error diffusing unit 50c of the image data input unit 50.

The compressing section 51h compresses the 1-bit data by a so-called "run length" encoding. The compression of the image data is conducted through a last processing loop when the image data have a final form of output image data.

The image data output unit 52 includes a restoring section 52a, a quantizing section 52b, an error diffusing section 52c, and a laser output section 52d. The image data output unit 52 restores the image data which have been stored in a compressed form in the memory 53, and reconverts the resulting image data into data representing 256 tones. Thereafter, the image data output unit 52 converts the resulting data into data represented by two bits which provide a smoother half-tone image than that of the 1-bit data by an error-diffusing operation, and transfers the resulting data to the laser output unit 52d. The image data thus obtained are finally sent to the laser write unit 32 of the printer 3, where an image is formed.

More specifically, the restoring section 52a restores image data thus compressed by the compressing section 51h. The quantizing section 52b conducts an identical operation to that conducted by the quantizing sections 51a and 51b of the image processing unit 51. The error diffusing section 52c conducts an identical operation to that conducted by the error diffusing unit 50c of the image data input unit 50. The laser output section 52d converts digital pixel data into laser ON/OFF signals in accordance with a control signal supplied from a sequence controller (not shown in the drawings), and the semiconductor laser of the laser write unit 32 shifts from an ON state to an OFF state or vice versa in response to the laser ON/OFF signals, thereby writing an electrostatic latent image on the photosensitive drum 44.

Note that the data treated by the image data input unit 50 and the image data output unit 52 are stored in the memory 53 basically in the 1-bit data form so as to save the capacity of the memory 53, but it is possible to store the data in the 2-bit data form to prevent deterioration of the image data.

(Control Block Arrangement of Digital Copying Machine)

Figure 5:
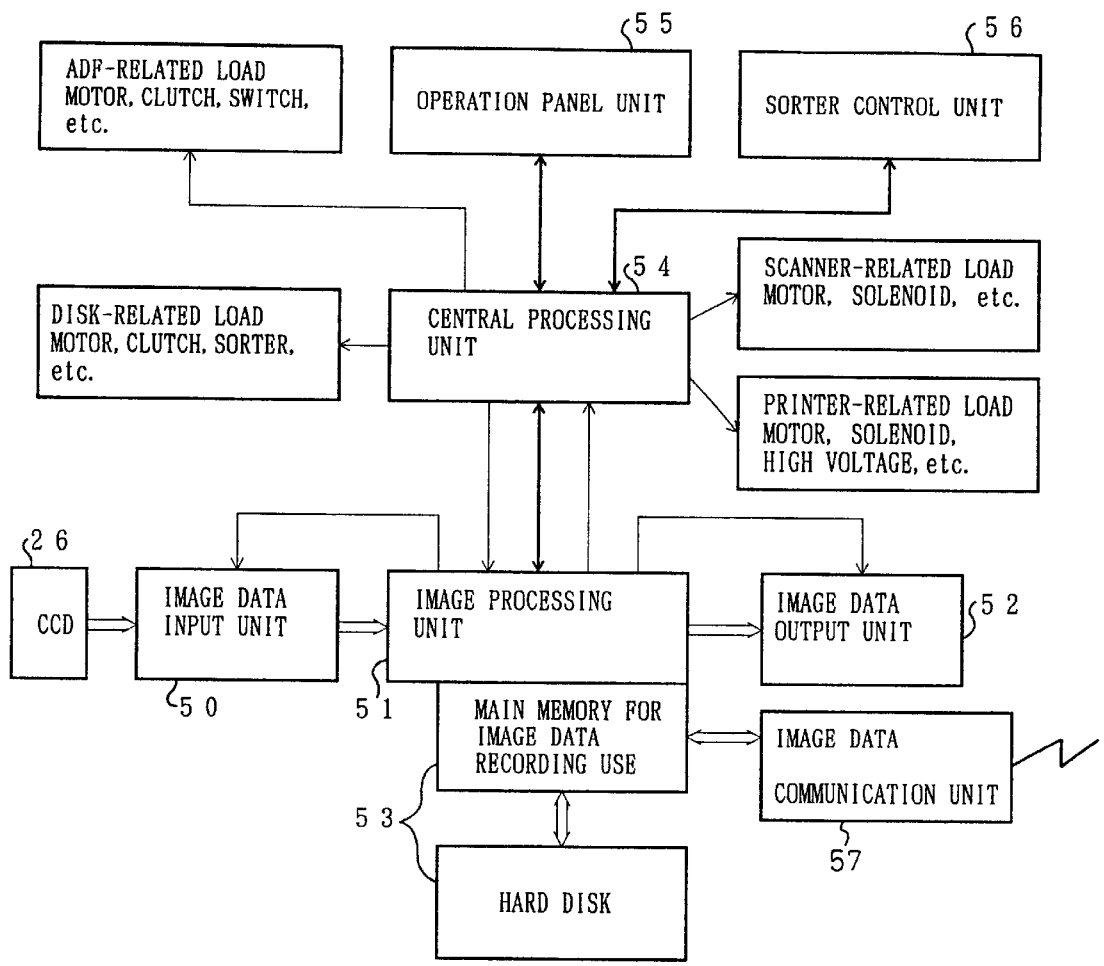
FIG. 5 is a block diagram illustrating a whole control system of the digital copying machine shown in FIG. 3.

FIG. 5 is a view illustrating a state where each member of the digital copying machine 1 is controlled by the CPU 54.

Explanations about the CCD 26, the image data input unit 50, the image processing unit 51, the image data output unit 52, the memory 53, and the CPU 54 are omitted, since they are already explained in conjunction with FIG. 4.

The CPU 54 controls, by sequence control, each of the driving members constituting the digital copying machine 1, such as the RADF 22, the scanner 2, and the printer 3, by outputting control signals for controlling the above members.

Furthermore, the CPU 54 is connected with an operation panel unit 55 composed of an operation panel and the like in a reciprocally communicative state, so that control signals are transferred to the CPU 54 in accordance with any one of various modes set by the operator, so as to cause the digital copying machine 1 to function in accordance with the set mode.

Control signals indicating an operational state of the digital copying machine 1 are sent from the CPU 54 to the operation panel unit 55. The operation panel unit 55 indicates the operational state by using a display member in response to the control signals so that in what state the digital copying machine 1 remains at present is shown to the operator. In other words, the CPU 54 functions as control means and setting means recited in claims.

A sorter control unit 56 is a control unit for controlling operations of the post-processing device which sorts out copies outputted from the digital copying machine 1 and performs other operations.

An image data communicating unit 57 is intended to enable transmission of information including image information and image control signals with another digital image apparatus.

(Operation Panel of Digital Copying Machine)

Figure 6:
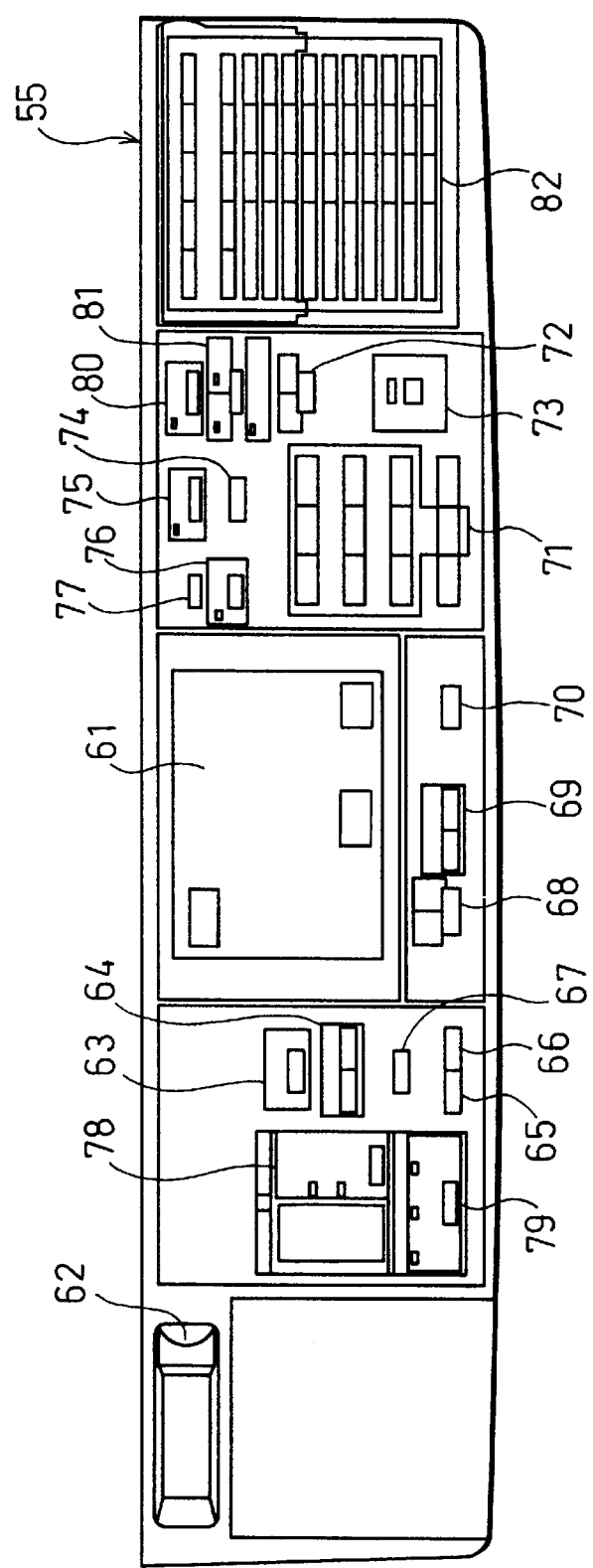
FIG. 6 is a plan view illustrating an example of an operation panel provided in the digital copying machine shown in FIG. 3.

FIG. 6 illustrates the operation panel provided in the operation panel unit 55 of the digital copying machine 1. In a center portion of the operation panel, there is provided a touch panel liquid crystal display (LCD) device (display means) 61, and a mode setup key group is provided therearound.

On a screen of the touch panel LCD device 61, there is a screen switching command pattern for switching to a screen for selecting normal image editing functions. By pressing the screen switching command pattern with a finger, a list of image editing functions is displayed on the liquid crystal screen so that any one of them can be selected. When the operator touches a pattern indicating a function that the operator demands, the function is selected and prepared.

The following description will briefly explain the mode setup keys provided on the operation panel. 62 is a dial for adjusting brightness of the screen of the LCD device 61.

63 is an "automatic magnification" key for setting a mode for automatically selecting a magnification rate, 64 is a "zoom" key for zooming by 1% at a time, 65 and 66 are "fixed magnification" keys for reading and selecting a fixed magnification rate, and 67 is a "life-size copy" key for resetting the magnification rate to a standard magnification rate (life-size copy mode).

68 is a "density change" key for switching a copy density adjustment mode between an automatic mode, a manual mode, and a photographic mode, 69 is a "density adjustment" key for minute adjustment of density in the manual mode or the photographic mode, and 70 is a "cassette (tray) select" key for selecting a sheet of paper in a desired size, among those stored in the paper feeding unit of the copying machine.

71 is a "copy number set" key for setting the number of copies to be produced. 72 is a "clear" key which is used for clearing the set number of copies to be produced, or stopping a continuous copying operation by half. 73 is a "start" key ("print" switch) for commanding commencement of a copying operation. 74 is a "clear all" key for cancelling all the mode now set and restoring a predetermined standard state. 75 is an "interruption" key for temporarily stopping a current copying operation and allowing a copying operation of another document. 76 is an "operation guide" key which is used for displaying a message of instruction about an operation of the copying machine, when how to operate the copying machine is unclear. 77 is a "message scroll" key for scrolling the message screen so that a sequel to the message displayed in response to the operation of the "operation guide" key 76 should be displayed.

78 is a "double-side copy" key for setting the double-side copy mode. 79 is a "post-processing" key for selecting an operational mode of a post-processing unit 43 which sorts out sheets of produced copies (image-formed sheets) ejected from the copying machine.

Last, 80 through 82 are keys for setups relating to a printer mode and a facsimile mode. 80 is a "memory transfer mode" key for transferring data of a document after temporarily storing the data in the memory. 81 is a "copy/facsimile/printer mode select" key for switching the modes of the digital copying machine 1 between the copy, facsimile, and printer modes. 82 is a "rapid dial" key for setting a "rapid dial" operation. The "rapid dial" operation is an operation wherein, in the case where a telephone number of a destination is previously recorded, transmission to the destination is enabled just by pressing one button allocated for the telephone number.

The operation panel described above and the keys deposited on the operation panel are merely examples, and needless to say, the keys provided on the operation panel vary depending on what functions are given to the digital copying machine 1.

(Example of Setting of Conditions Relating to Image Formation)

The following description will explain the setting of conditions relating to image formation functions rendered to the digital copying machine 1. The operation for setting conditions includes operations for setting various functions of the image forming device. Here, a concrete example of a function setup operation by using the touch panel LCD device 61 will be explained, with reference to FIG. 7.

Figure 7:
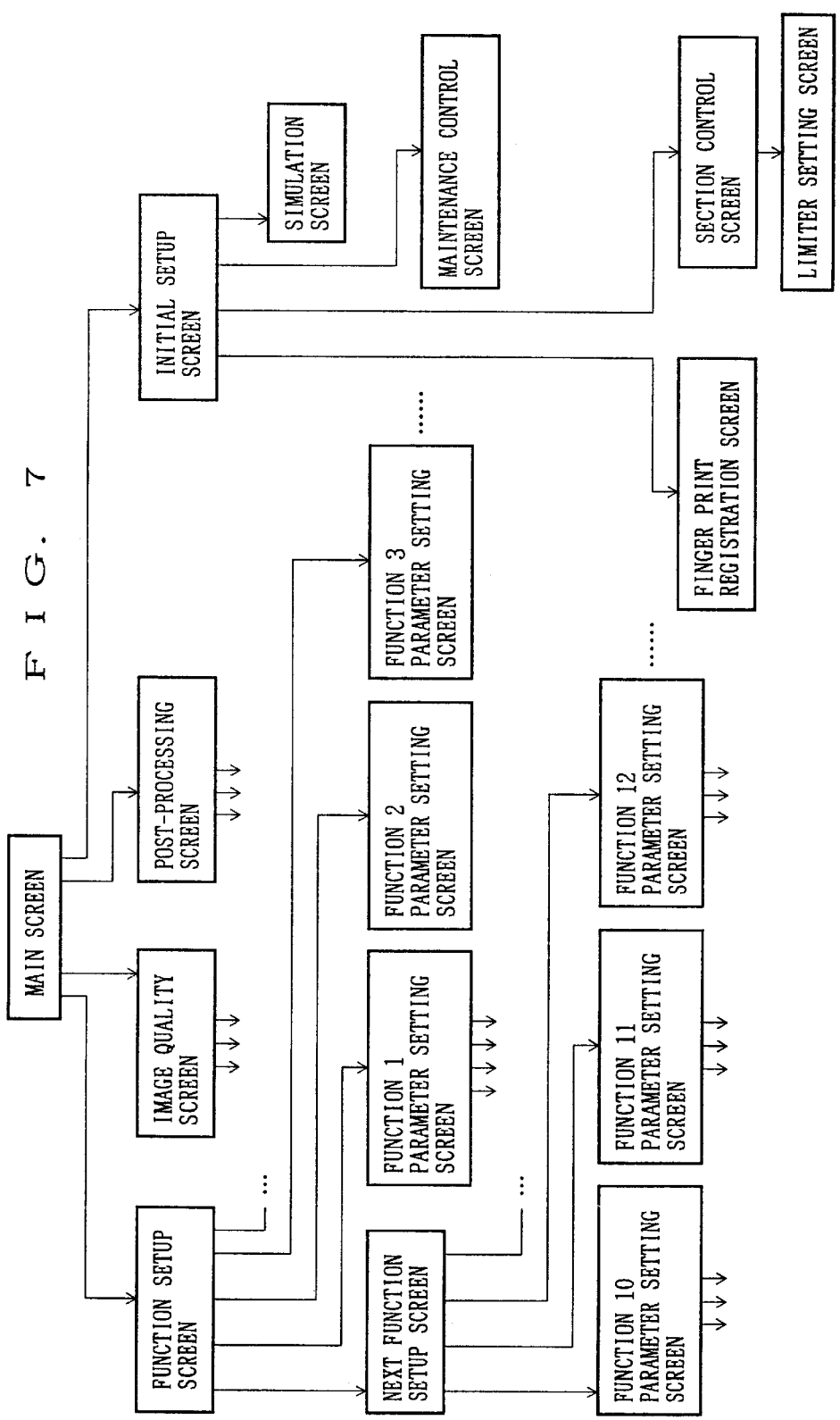
FIG. 7 is an explanatory view illustrating a display image shifting process of a touch panel liquid crystal display device which is mounted on the operation panel shown in FIG. 6.

FIG. 7 illustrates a display image shifting process of the touch panel LCD device 61, and on the touch panel LCD device 61, a main screen appears. On this main screen, various patterns including a "function" pattern, an "image quality" pattern, a "post-processing" pattern, and an "initial setup" pattern. By touching any one of them (touching a surface of the touch panel LCD device), the screen of the touch panel LCD device 61 is switched to a screen corresponding to the touched pattern.

The main screen appears, for example, as shown in FIG. 8(*a*), on which the "function" pattern, the "image quality" pattern, the "post-processing" pattern, and the "initial setup" pattern are displayed.

By softly touching the "function" pattern of the main screen, the main screen is switched to a first function setup screen. When on this screen an operational pattern for switching to a next screen is touched, the first function setup screen is switched to a second function setup screen (NEXT function setup screen). On the other hand, on the first function setup screen, an operational pattern for switching to the main screen is touched, the screen is switched to the main screen.

For example, the "function" pattern is touched on the main screen shown in FIG. 8(*a*), the first function setup screen on which selection of various functions for editing images is enabled appears, as shown in FIG. 8(*b*). Here, in case the "main screen" pattern is touched, the main screen is recovered as described before. On the other hand, by performing an operation for switching to the second function setup screen, that is, touching "next" pattern, the second function setup screen appears, as shown in FIG. 8(*c*).

Besides, aside from the "main screen" pattern and the "next" pattern, the first function setup screen has patterns for setting various editing functions of mirror image, slanting, inversion, shadowing, trimming, and masking. These patterns function as setup keys constituting condition input means. For example, by touching the "slanting" pattern, the screen is switched to a screen for slanting an image such as a character at a desired angle, and such setup is enabled.

On the other hand, by touching the "image quality" pattern or the "post-processing" pattern in the main screen, an image shown in FIG. 8(d) or 8(e) appears, and a desired setup can be performed. Furthermore, in the initial setup screen (see FIG. 9(a)), setups in respect to finger print registration (see FIG. 9(b)), section control (see FIG. 9(c)), a limiter (see FIG. 9(d)), and simulation (see FIG. 9(e)) are arbitrarily performed.

Just for reference, regarding the above-described functions which are desirably set for image editing, Table 1 below shows the functions for setups relating to image formation and outlines of processing operations by the functions. Note that the functions rendered to the digital copying machine 1 are not limited to the image editing (processing) functions shown in Table 1 below.

TABLE 1

| IMAGE EDITING FUNCTION | OUTLINES OF PROCESSING OPERATIONS |
|---|---|
| INDEPENDENT MAGNIFICATION | SEPARATELY SETTING MAGNIFICATION RATES IN A VERTICAL DIRECTION AND A HORIZONTAL DIRECTION |
| SHARPNESS | ADJUSTING QUALITY OF COPIED IMAGE |
| BINDING MARGIN | CREATING A DESIRED BINDING MARGIN IN A COPY |
| BORDER ERASING | ERASING A BORDER OF A DOCUMENT WHICH APPEARS IN BLACK IN A COPY |
| CENTERING | POSITIONING A CENTER OF A COPIED IMAGE TO A SUBSTANTIALLY CENTER OF A SHEET |
| ONE SET TWO COPIES | COPYING PAGES OF A BOOK |
| DESTINATION COPY | INCLUDING A DESTINATION IN A COPY |
| MULTI-SHOT COPY | COPYING A PLURALITY OF IMAGES OF DOCUMENTS IN ONE SHEET |
| TRIMMING | COPYING ONLY DESIGNATED PARTS OF A DOCUMENT |
| MASKING | COPYING A DOCUMENT BY ELIMINATING A SPECIFIED PART THEREOF |
| MOVE FUNCTION | PRODUCING A COPY BY MOVING A DOCUMENT IMAGE TO A DESIRED POSITION |
| COMPOSITION | PRODUCING A COMPOSITE COPY FROM A PLURALITY OF DOCUMENTS |
| BLACK-AND-WHITE INVERSION | COPYING A DOCUMENT IMAGE BY INVERTING THE NEGATIVE AND POSITIVE RELATION OF THE DOCUMENT IMAGE |
| HALF-TONE MESHES | PRODUCING A COPY BY ADDING A MESH-LIKE PATTERN IN BLACK OR WHITE TO A DOCUMENT IMAGE |
| SHADOWING | PRODUCING A COPY BY ADDING SHADOW TO A DOCUMENT IMAGE |
| OPEN LETTER | PRODUCING A COPY BY PRINTING ONLY OUTLINES OF A DOCUMENT IMAGE |
| SLANTING LETTER | PRODUCING A COPY BY SLANTING A DOCUMENT IMAGE |
| MIRROR IMAGE | PRODUCING A COPY BY REVERSING A DOCUMENT IMAGE AS IF REFLECTING IT BY A MIRROR |
| REPEAT COPY | PRODUCING A PLURALITY OF COPIES OF A SAME DOCUMENT IMAGE IN ONE SHEET |
| 2 IN 1 COPY | COPYING TWO DOCUMENTS IN ONE SHEET |
| DATE | PRINTING A DATE WHEN PRODUCING A COPY |
| CENTER MARK | PRINTING A CENTER MARK WHEN PRODUCING A COPY |

(Example of Interconnection between Image forming Devices in Image forming system)

Figure 10:
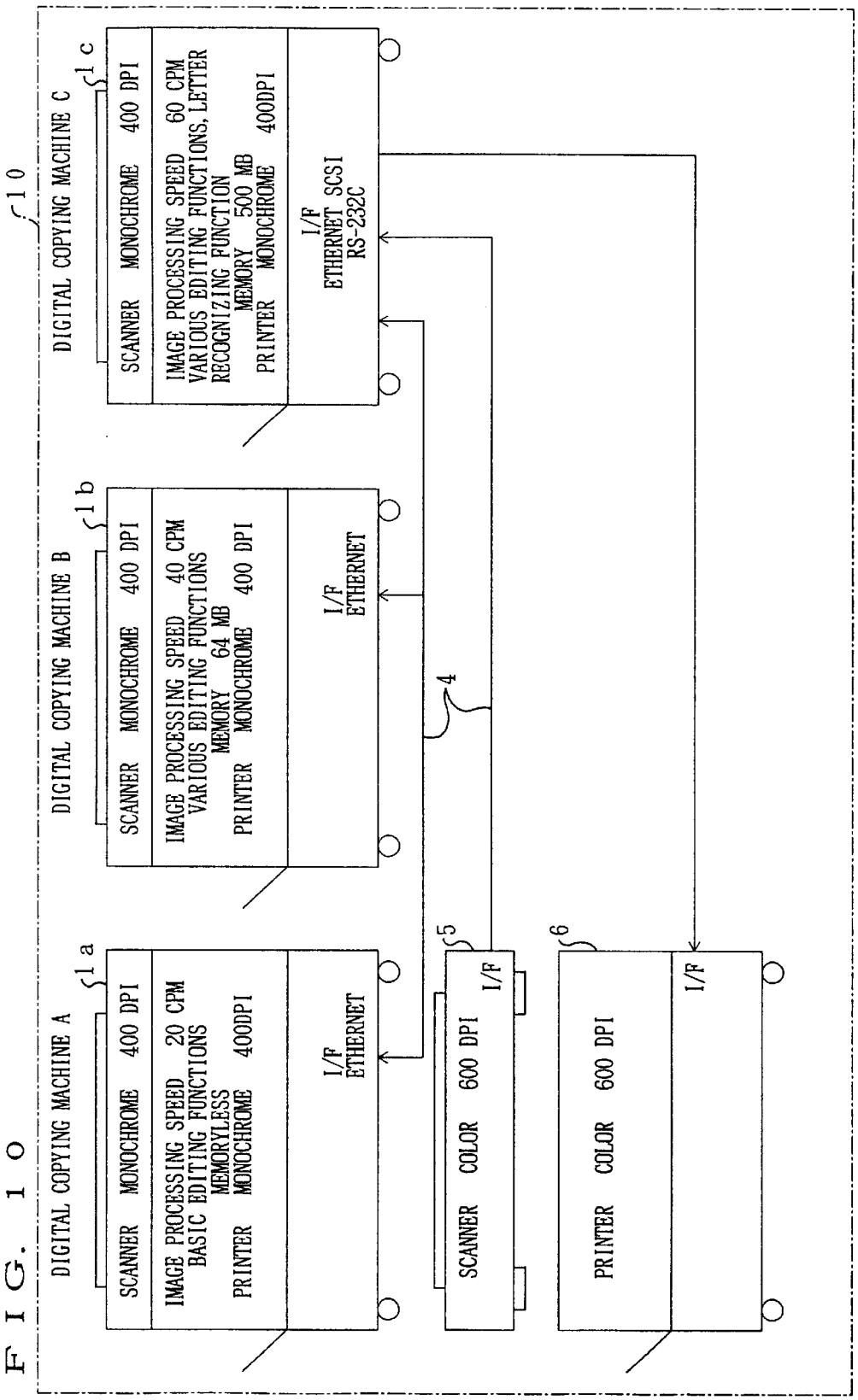
FIG. 10 is an example of interconnection of digital copying machines each serving as the image forming device constituting the image forming system of the present invention.

FIG. 10 illustrates an example of interconnection of digital copying machines of the image forming system in accordance with the present invention. For example, a plurality of digital copying machines 1a through 1c are interconnected through communication lines 4 and communication means, thereby constituting an image forming system 10. The image forming system 10 is equipped with a color scanner 5 and a color printer 6 as other information apparatuses, which are also interconnected with the digital copying machines 1a through 1c through the communication lines 4.

The information apparatuses are interconnected by general-purpose I/Fs (interfaces) such as SCSIs, as well known, whereby exchange of data is enabled between the information apparatuses. The data exchanged include command codes for control use, bit data such as image density data, and the like. The digital copying machines 1a through 1c may have different processing functions, or may have the same processing functions.

For example, the digital copying machine 1a is a memoryless, low-functional, and low-price digital copying machine, which is not capable of recording image information in a memory and has only basic editing functions. The "basic editing functions" here described mean functions which can be executed without a memory, such as the black-and-white inverting function, the slanting function, and the mirror image producing function. The digital copying machine 1a has as an I/F an ethernet or the like allowing rapid transmission of image data, and a copying speed is about 20 CPM (CPM: the number of sheets of A4-size paper printed out per one minute).

A second digital copying machine 1b is provided with a memory of 64 MB (for example, a capacity for storing data corresponding to images printed on 4 sheets of A4-size paper at 400 DPI and 8 bit/pix), and has various functions such as the composition and the repeat copy, in addition to the basic editing functions. The digital copying machine 1b has an I/F capable of rapid transmission like the digital copying machine 1a, and its printing speed is at a mid level, about 40 CPM.

Furthermore, the digital copying machine 1c is equipped with a memory of a large capacity of 500 MB (for example, a memory capable of storing data corresponding to images printed on 100 sheets of A4-size paper at 400 DPI, 8 bit/pix, and a compressing rate of ¼), thereby having functions of changing the order of pages and storing data of documents in various formats, as well as the same editing functions as those of the digital copying machine 1b. On top of that, a software for recognizing letters and characters in the data read out is also installed therein, and the machine is also capable of encoding bit data. The digital copying machine 1c comprises a high-speed engine (image forming unit) with a printing speed of 60 CPM, and has as its I/F not only a communication line allowing rapid transmission of image data similar to those of the digital copying machines 1a and 1b, but also a general-purpose I/F (SCSI, RS-232C). Therefore, interfacing the copying machine 1c with the second information apparatus (a color scanner 5 and a color printer 6) is possible.

Besides, aside from the digital copying machine 1 described above, information apparatuses including a color scanner 5 having a reading resolution of 600 DPI and a color printer 6 capable of printing images at a recording density of 600 DPI are interconnected through I/Fs, particularly with the digital copying machine 1c, thereby allowing reciprocal transmission of image information.

The digital copying machine 1c which has, as described above, the most image processing functions among the image forming devices constituting the image forming system 10 and has a large-capacity image memory, is adapted to be used as a first copying machine. By doing so, various image processing functions and image memories are effectively utilized through the digital copying machine 1a or 1b which are connected by communication means composed of I/Fs and the communication lines 4.

Then, the following description will explain an operation by allocating an image outputting job in a state of the mutual interconnection of the digital copying machines 1a through 1c which constitute the image forming system 10.

It should be noted that the functions rendered to the digital copying machines are not limited to those of the digital copying machine described above, since generally they largely depend on prices and capacities of image memories. Actually digital copying machines of various specifications have been proposed and commercialized. Therefore, the operator selects necessary functions from among those shown in Table 1, and selects a digital copying machine which is capable of executing the functions, from among these digital copying machines commercialized. By using the copying machine thus selected as the machine operated by the operator or the destination machine controlled by the machine operated by the operator, desired hard copies can be obtained.

(Example 1)

Figure 2:
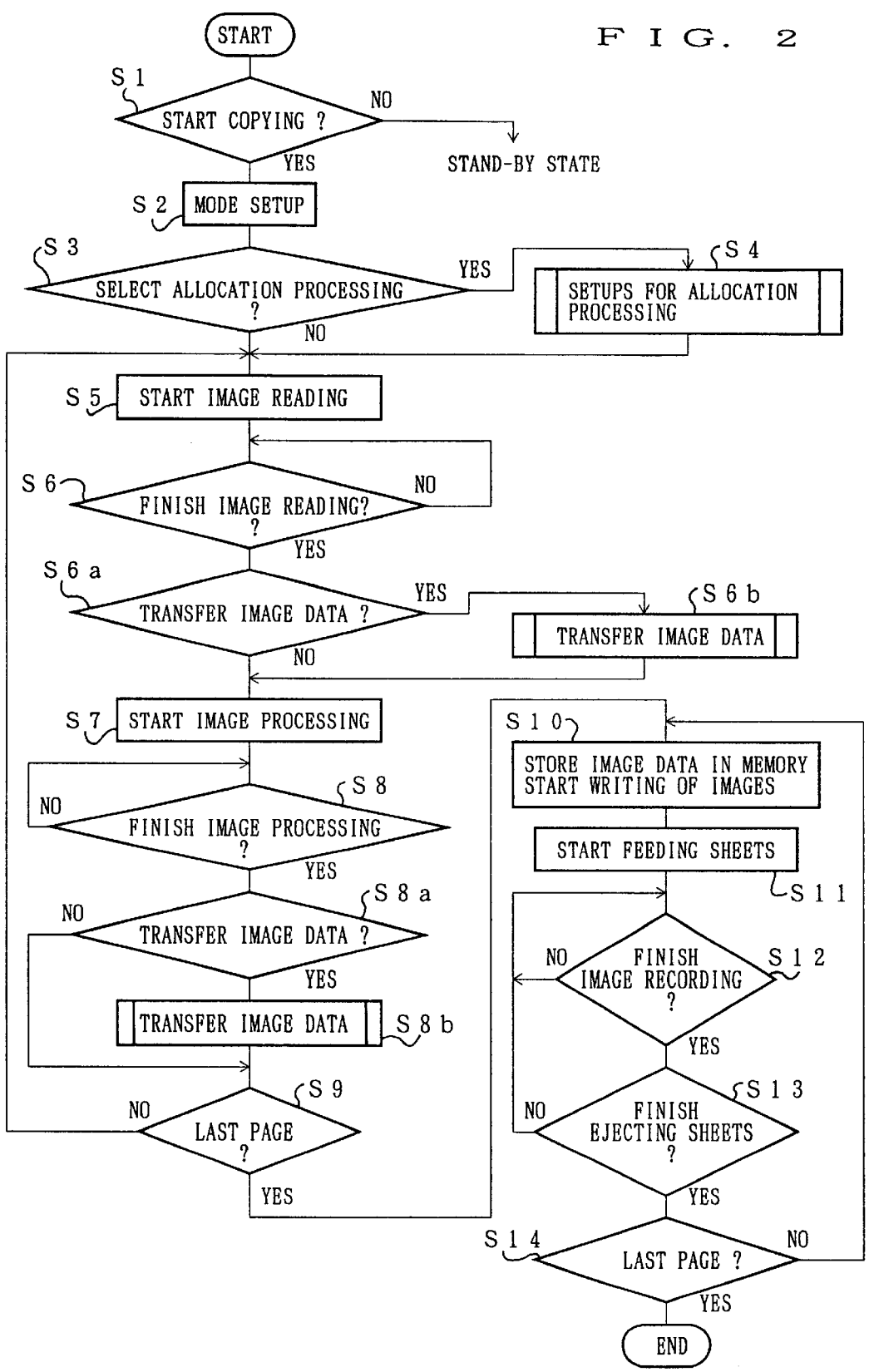
FIG. 2 is a flowchart illustrating a processing control by an image forming system of the present invention.

The following description will explain a concrete example of an operation of the image forming system of the present invention, while referring to a control flow of FIG. 2.

The digital copying machine 1 (for example, 1c) is in a stand-by state, being ready for accepting any desired copy mode, which is set by selecting operations such as function setups and setting of the number of copies with the use of the keys on the operation panel shown in FIG. 6, as well as being ready for an operation by a start key 13 (S1). When the start key 13 is operated, the CPU 54 resets the image processing unit 51, and then, outputs a command for a mode setup to the image processing unit 51 in accordance with conditions set by the operation panel unit 55, whereby the mode setup is performed (S2).

Subsequently, the CPU 54 first checks whether or not an instruction for the allocation processing operation has been given by the operation panel unit 55 (S3). Here, the following is assumed: if the operator desires the allocation processing operation, for example, in the case where the number of copies to be produced is great and the operator judges that it will take much time to complete the job with the sole copying machine, the operator instructs that the outputting job should be allocated to other copying machines as well, upon the initial setup of conditions. According to the instruction, the CPU 54 performs setups for the job allocating operation (S4). The setups for the job allocating operation are shown in the control flow of FIG. 1 in detail, and will be described later in more detail.

In the case where it is judged at the step S3 that the job allocating operation should be performed, the CPU 54 executes the processing of the step S4, and then, gives an image input command to the image processing unit 51, so as to cause a scanner unit 23 to start reading an image (S5). In the case where no command for the allocation processing operation has been given, the scanner unit 23 is caused to start image reading, without the processing of the step S4 (S5).

Then, the scanner unit 23 scans the document image so as to read it, and when input of a document image is completed (S6), the CPU 54 gives an image processing command to the image processing unit 51, thereby causing the image processing unit 51 to start image processing (S7).

Before the image processing is performed at the step S7, whether image data read by the scanner unit 23 should be transferred to other copying machines available for the allocation processing operation before or after being subjected to the image processing is judged (S6a). This is because if the image data are to be allocated and processed, there are a case where the image data are preferably transferred before the image processing and a case where the image data are preferably transferred after the image processing. In other words, in the case where it is judged that the image processing by the functions selected by the operator cannot be executed by another copying machine or in the case where it is better to transfer the image data after the image processing, the image processing is started with respect to the readout image data, without transferring the readout image data at the step 6b (S7). Or, in the present invention, if the processing efficiency is enhanced in the case where the readout image data are transferred to other copying machines before the image processing, the image data as obtained are transferred to other copying machines (S6b). This is, as will be explained below, because if the readout image data can be treated in a code form, it is preferable from a viewpoint of transfer efficiency to transfer the image data before the image processing.

The image processing starts at the step S7, and when the image processing finishes with respect to readout image data of one page of a document (S8), it is judged whether or not the processed image data should be transferred to other copying machines (S8a). Here, in the case where it is judged that the processed image data should be transferred, the processed image data are transferred (S8b). Note that in the case where there are a plurality of pages, the next document image is read (S5) in parallel with the image processing and the transfer. In other words, at a step S9, whether or not the page whose image was processed at the step S7 is the last page is judged, and in the case where there are a plurality of pages and the operation has not yet reached the last page, the operation flow goes to the step S5. Besides, note that the processed image data are transferred to other copying machines at the step S8a only in the case where the job allocation was performed and the readout image data were not transferred at the step S6a.

When the image processing with respect to the last page finishes, the image formation is executed. Specifically, the processed image data that have been stored in the memory 53 are read out, and image output in accordance with the readout image data is performed at the printer 3. To do so, the image data in the memory 53 are sent to the laser write unit 32, and the writing of images to the photosensitive drum 44 by using the laser is started (S10). Simultaneously the feeding of sheets is started (S11), and the image formation finishes when the recording of images of all the pages on the sheets finishes and the sheets are all ejected (S12 through S14).

(Example of Job Allocation)

When the operator, by using one copying machine, for example, a copy machine 1c, instructs the job allocation to a plurality of copying machines by operating various keys on the operation panel, whether or not the allocation to other copying machines is possible is checked at the step S4 in FIG. 2, for example, in an image forming system 10 shown in FIG. 10.

The following description will explain this operation while referring to FIG. 1. This operation is executed by the CPU 54, and the CPU 54 performs the processing routine shown in FIG. 1 at the step S4 in FIG. 2, in response to the instruction by the operator for the job allocation.

First of all, the digital copying machine 1c, which is a copying machine used by the operator and through which an instruction for the job allocation is launched (this machine is hereinafter referred to as "allocating machine" (first image forming device)), judges whether or not conditions this time are identical to those when the previous job allocation was instructed (S20). If they are not identical, flags indicating various conditions that the operator requests are set. To be more specific, the digital copying machines 1a through 1c control image processing information (for example, function setups shown in Table 1), post-processing information (information on utilization of the post-processing unit 43), paper size information (a size of paper selected), and the like by using flag tables. Therefore, condition flags that correspond to the flag tables respectively are set by the digital copying machine 1c as the allocating machine, based on information on the aforementioned various setups including the image processing information (S21).

For example, in case the trimming is set and it is included in the image processing information, a flag indicating the trimming is set. In case the A4-size paper is designated, a flag indicating the A4-size paper is set. In case the post-processing operation is unnecessary, a flag indication the post-processing operation is not set.

Then, in the image forming system 10, a copying machine whose setups match the aforementioned conditions is searched for (S22). In other words, whether or not functions of another digital copying machine, for example, the digital copying machine 1a, match the aforementioned conditions of the processing is checked, and whether or not the digital copying machine 1a is available for the processing operation allocated is checked (S23).

At the step S23, the flags thus set indicating the conditions requested are compared with the setups of the digital copying machines 1a, and whether or not the digital copying machine 1a is able to meet the request for the processing under the conditions is judged. If the digital copying machine 1a is able to do so, the digital copying machine 1a is nominated as a destination of the allocation (such a machine is hereinafter referred to as a destination machine (second image forming device)), and it is registered (recorded) (S24). If the digital copying machine 1a is not able to do so, such judgement is repeatedly conducted with respect to still another digital copying machine, for example, the digital copying machine 1b (S25→S22 through S24). By repeating the sequence of the steps S22 through S25, whether or not the allocation is possible is judged regarding all the digital copying machines interconnected in the image forming system 10, and the job allocation is executed in accordance with the list of the destination machines (the process after the step S29).

Note that the processing through the steps S26 to S28 shown in FIG. 1 is performed only in the case where the operator prioritizes some on the list, and this prioritization will be explained later.

In performing the allocation, first the allocating machine performs the job allocation request with respect to the destination machines. More specifically, in the case where the destination machines selected through the steps S22 to S24 are not available because they are currently performing image formation or are out of work due to troubles or the like, the allocation cannot be performed. Therefore, the allocating machine sends an allocation processing request command to the destination machines in advance (S29) and receives response commands from the destination machines (S30), then renews the destination machine list according to the response commands (S31). In the case where the destination machines are not available for the reasons described above, a command indicating the unavailability is returned, and according to it the registration on the list is renewed.

After the renewal, whether or not any destination machine is registered is checked (S32), and if any, setups necessary for the allocating operation, such as the setting of the number of copies, are conducted with respect to the destination machine (S38). If a command indicating the unavailability is returned from the destination machines and no destination machine is listed as a result of renewal of registration, whether or not any destination machine has been excluded from the list due to least priority is checked (S33). Some destination machines which are particularly prioritized have been selected among the destination machines through the steps S26 to S28 shown in FIG. 2 whereas some are excluded from the list in case they are less prioritized, and in the aforementioned case, such a machine thus excluded is re-selected. Details of this operation will be explained later. The step of setting the number of copies (S38) will be explained in more detail later.

As described above, the copying machines used for the allocation processing operation are efficiently selected in the image forming system 10 shown in FIG. 10. When the routine work shown in FIG. 1 is completed, the processing ensuing to the step S5 of FIG. 2 is performed. Here, either image data or processed image data are transferred in a manner suitable for the selected destination machines so that the greatest processing efficiency can be achieved.

In case the operator merely requests the allocation and give such instruction to the allocating machine, the allocating machine searches for machines available for the allocation processing operation among those in the image forming system 10. Here, if image processing conditions are appropriately set, the allocating machine searches according to image processing conditions, thereby searching out copying machines whose setups match the set conditions, and selecting them as destination machines. Thus, burdens on the operator are reduced, while an output as a result of image processing which the operator requested is obtained.

Thus, in case an output job is allocated in the image forming system in which a plurality of copying machines are interconnected through communication lines, copying machines which are capable of an output operation requested by the operator are searched for, with reference to conditions inputted by using the allocating machine and the like. Therefore, the operator no longer needs to select copying machines suitable for the allocation processing operation for him/herself, and moreover, such outputs as the operator does not request by no means occur.

(Example of Prioritization)

If more efficient processing is desired in performing the allocation processing operation, preferable copying machines may be searched for among the machines available and selected (prioritized) as destination machines. More specifically, in the case where the operator requests prioritization, before proceeding to the operation shown by the flow in FIG. 2, the operator designates a matter to be considered in prioritization, which is used as reference in selecting copying machines to be prioritized (hereinafter such a matter to be used as reference is referred to as prioritization reference). By doing so, the prioritized copying machines are searched for, and the copying machines thus searched out are selected as the destination machines, to which the output job is allocated. The following description will explain an example of such prioritizing process.

In the flow of FIG. 1, copying machines available for the allocation processing operation are selected through the steps S22 to S24, and then, in the case where the operator does not request the prioritization, the process ensuing to the step S29 is performed. On the other hand, in the case where the operator requests the prioritization, copying machines to be prioritized are searched for among the selected copying machines available for the allocation processing operation, through the steps S26 to S28.

Here, as described above, in case the operator appropriately designates a prioritization reference, the copying machines with high degrees of priority are searched for so that the utility efficiency is enhanced.

An example of a prioritization reference is communication efficiency. In this case, interfaces I/F interconnected through communication lines are considered, and the most efficient copying machine is prioritized. For example, transfer efficiency in the case where pre-processed readout image data are transferred is compared with that in the case where processed image data are transferred, and the transfer scheme with higher efficiency is selected. In other words, efficient transfer schemes for the individual copying machines available for the allocation processing operation may differ from each other, the transfer scheme of each copying machine being either the transfer of readout, pre-processed image data, the transfer of processed image data, or transfer of compressed processed image data. Therefore, if the allocating copying machine transfers data in manners suitable for the destination machines respectively, the load on the allocating machine increases. In contrast, if the transfer is performed in a single common manner, the load on the allocating machine is remarkably reduced, thereby enhancing the processing efficiency.

Figure 11:
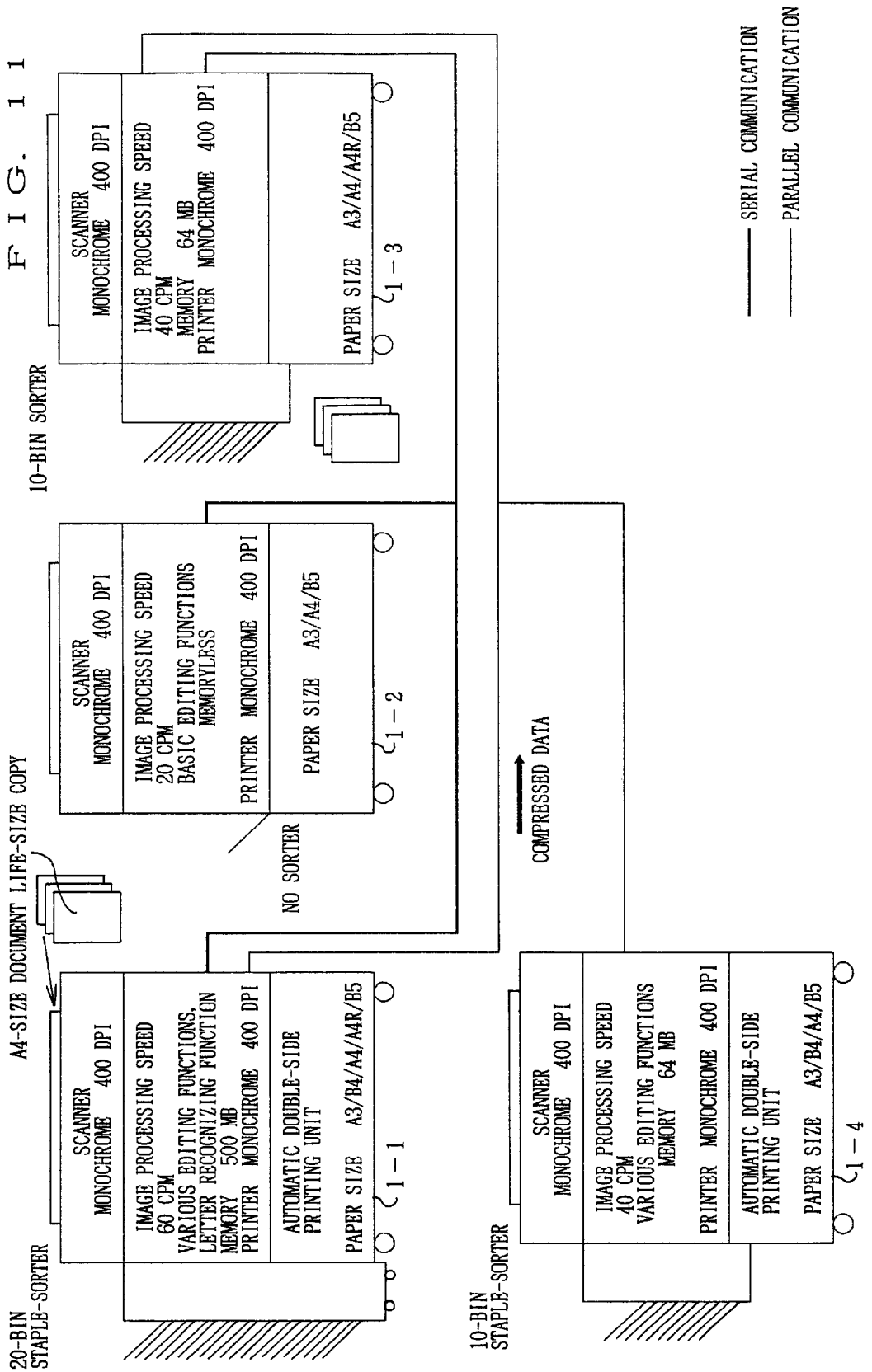
FIG. 11 is a view illustrating another example of the interconnection of the image forming system of the present invention, the view being intended to explain an example case of prioritization to enhance transfer efficiency.

The following description will explain an example of prioritization, while referring to FIG. 11. In an image forming system shown in FIG. 11, four digital copying machines are interconnected through communication lines. Here, digital copying machines 1-1, 1-2, and 1-3 are connected so that serial communication is possible, while digital copying machines 1-1, 1-3, and 1-4 are connected so that parallel communication is possible. Assume that the allocating machine which the operator directly operates is the digital copying machine 1-1, and the digital copying machines 1-2, 1-3, and 1-4 are selected as copying machines whose setups match conditions inputted by using the digital copying machine 1-1 and which are available for the allocation processing operation. In this case, by a searching operation for prioritization (S26), respective communication states of the copying machines are checked.

Then, copying machines with better communication efficiency are selected. In the case shown in FIG. 11, the digital copying machines 1-3 and 1-4 with which parallel communication is possible are selected to be prioritized. Registration of prioritized copying machines is renewed at every repetition of an operation through the steps S26 to S28 in FIG. 1, whereby the destination machine list is renewed.

As described above, the copying machines which are regarded as most efficient in communication when the transfer scheme is taken into consideration are selected. On the other hand, copying machines whose transfer scheme is shared by as many copying machines as possible may be prioritized. For example, in the case shown in FIG. 11, since the number of the copying machines capable of parallel communication with each other is equal to the number of the copying machines capable of serial communication with each other, the copying machines capable of parallel communication which is more efficient are necessarily prioritized. However, in the case where the number of the copying machines capable of serial communication is greater, those are prioritized.

Furthermore, in prioritization, it is important to decrease the transfer-related load on the allocating machine, as described above. On top of that, by prioritizing copying machines so that data are transferred to as many copying machines as possible in a single scheme, the transfer-related load on the allocating machine can be decreased, while an output job is allocated to many copying machines thereby improving the total efficiency of the output operation.

Furthermore, in the case of the image forming system shown in FIG. 11, the digital copying machine 1-1 is capable of recognizing letters and characters, the greatest efficiency is achieved by transferring the image data in a character-code form. However, if character codes are transferred to other digital copying machines which do not have a function of recognizing letters and characters, the digital copying machines cannot develop the character codes transferred thereto into image data to be outputted. Therefore, if a copying machine capable of recognizing letters and characters, the copying machine is prioritized.

However, in the system shown in FIG. 11, no copying machine having a function of recognizing letters and characters exists. Therefore, as the second most efficient transfer scheme, the scheme of transferring compressed image data should be taken into consideration. In the case where image data are compressed and transferred, each of copying machines selected as destination machines is required to have a minimum memory needed to restore the compressed data to original image data. However, since the digital copying machine 1-2 does not have a memory, it cannot output a hard copy unless it receives data in an image-data form which the machine can process for outputting.

Therefore, the digital copying machines 1-3 and 1-4 having memories are selected and prioritized. In this case, compressed image data are transferred from the digital copying machine 1-1 to the digital copying machines 1-3 and 1-4, where the data are restored in the original image data.

By doing so, the digital copying machine 1-1 does not have to transfer data in different schemes respectively suitable for the destination machines available for the allocation processing operation, thereby by no means causing the processing efficiency to lower. In other words, digital copying machines which render the greatest efficiency are selected and prioritized from among the digital copying machines available for the allocation processing operation, and the output job can be allocated to the digital copying machines thus prioritized.

In this case, if a copying machine capable of recognizing letters and characters after reading images exists, it is prioritized when the prioritization is performed. Then, by performing the image data transfer through the steps S8a and S8b in the flow shown in FIG. 2, the processing efficiency can be enhanced as described above.

Furthermore, in the case where image data are to be transferred after being compressed, efficient processing can be achieved by compressing processed image data and transferring the compressed data to the destination machines every time image processing is completed, at the steps S8a and S8b of the flow shown in FIG. 2. By selecting any one among the aforementioned methods, the load on the allocating machine is decreased, thereby remarkably enhancing the processing efficiency. Besides, since copying machines that are capable of processing as much allocation as possible are selected, the output processing efficiency is improved.

The prioritization described above may be automatically executed by the CPU 54, or the operator may select a desired data transfer scheme in advance so that digital copying machines matching the data transfer scheme thus selected may be prioritized.

(Example 2)

In the above description, a data transfer scheme is set as the prioritization reference, and prioritization of copying machines to be used in the allocation processing operation is executed in accordance with the prioritization reference. However, instead of the prioritization in accordance with the prioritization reference, the operator may be arbitrarily select copying machines to be used for the allocation processing operation, among the digital copying machines available for the allocation processing operation. More specifically, in the flow shown in FIG. 1, copying machines other than the allocating machine which are available for the allocation processing operation are searched for through the steps S22 to S25 and a list of the destination machines available for the allocation processing operation is made and registered. Thereafter, prioritization is carried out through the steps S26 to S28. But instead of the operation through these steps, the operator may arbitrarily select copying machines.

Figure 12:
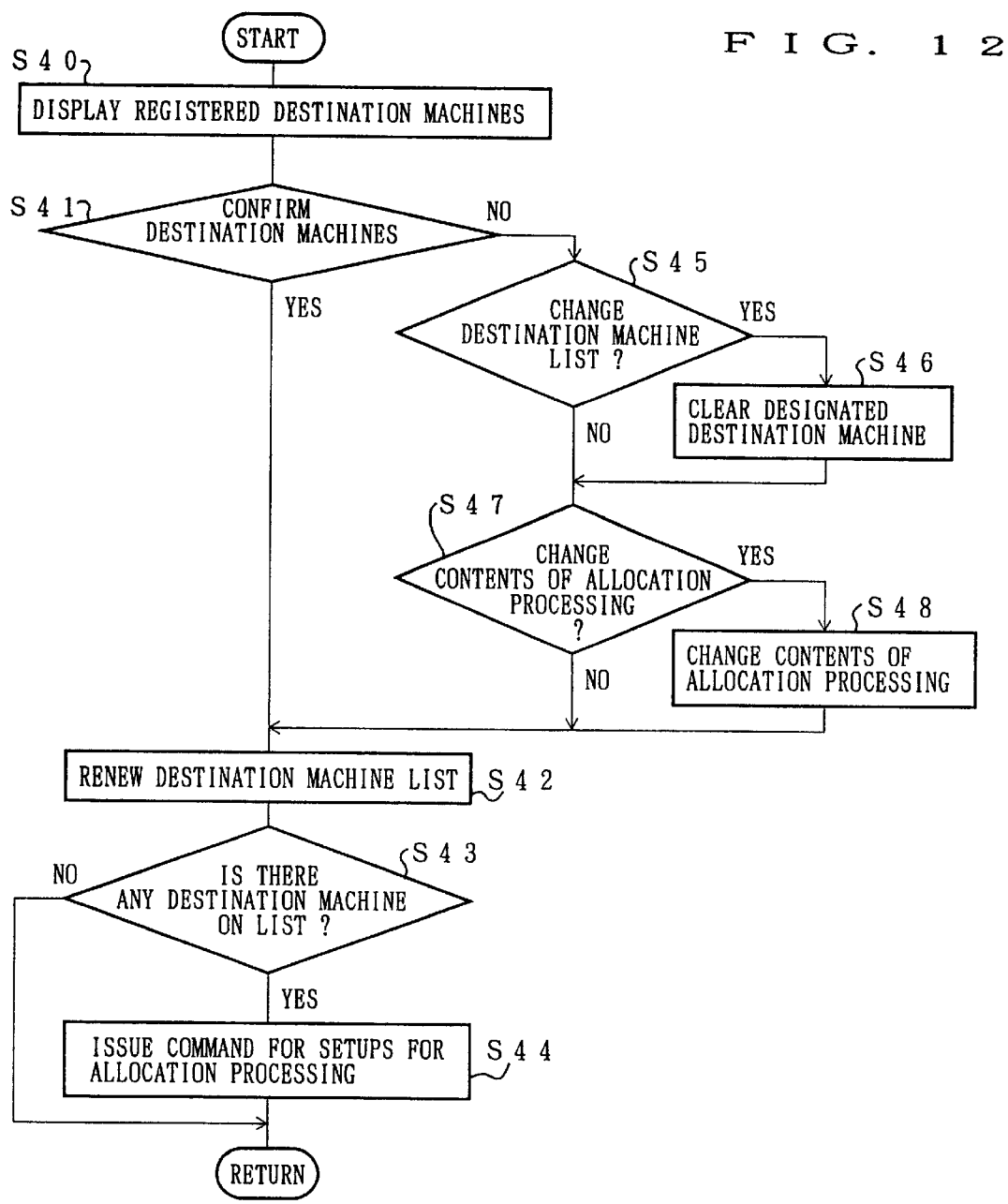
FIG. 12 is a control flowchart showing a control operation with which, among the image forming devices available for the allocation processing operation in the image forming system of the present invention, the operator freely selects some image forming devices to be used for the allocation processing operation.

In this case, when the destination machines are registered on the list, the flow proceeds through the step S25 of FIG. 1 to a processing routine of a flow shown in FIG. 12. Here, all the copying machines registered as the destination machines are displayed by the LCD device 61 (see FIG. 6) mounted on the operation panel of the allocating copying machine (S40). On the screen, numbers, locations, and the like of the destination copying machines are displayed. Referring to this display, the operator performs input of a result of selection, by touching portions of the screen indicating destination copying machines which the operator has selected. In the case where all the destination copying machines nominated are selected to be used for the allocation processing operation, for example, the renewal of the destination machine list may be performed by simply operating a confirmation key or the like (S41→S42). Here, it should be noted that in this case no change is rendered to the destination machine list. Thereafter, whether or not any destination machine is registered is checked (S43), and if any, setups necessary for the allocation processing operation are conducted with respect to the destination machine (S44). Then, the flow goes to the step S29 shown in FIG. 1. In this case, the commands for the setups are sent to the destination machine before the step S29 of FIG. 1, but they may be sent after the operation through the steps S29 to S31 shown in FIG. 1 is finished.

In the case where some copying machines available for the allocation processing operation are located not on the same floor but at remote locations, the operator is allowed to exclude such machines at remote locations from a group of the destination machines available for the allocation processing operation. In this case, referring to the locations of the destination machines displayed by the LCD device 61, the operator selects copying machines which are convenient for the operator (S41→S45). The copying machines excluded by the selection are excluded from the destination machine list (S46).

In the case where the destination machines available for the allocation processing operation are displayed together with functions thereof, it is possible to confirm or change contents of the processing operation (S47). To be more specific, in the case where higher-level image processing is to be performed, the operator re-select desired processing. Following this operation, contents of the processing to be performed are changed (S48). After the operation through the steps S45 to S48 finishes, the renewal of the destination machine list is performed (S42). Then, whether or not the destination machines on the list are available for the allocation processing operation is checked (an operation through the steps S29 to S31 of FIG. 1).

By doing so, the operator is allowed to further select copying machines which are most convenient for the operator, from among the copying machines available for the allocation processing operation. Moreover, the contents of the processing operation can be changed, regarding the selected copying machines. Therefore, hard copies desired by the operator can be obtained easily.

Figure 13:
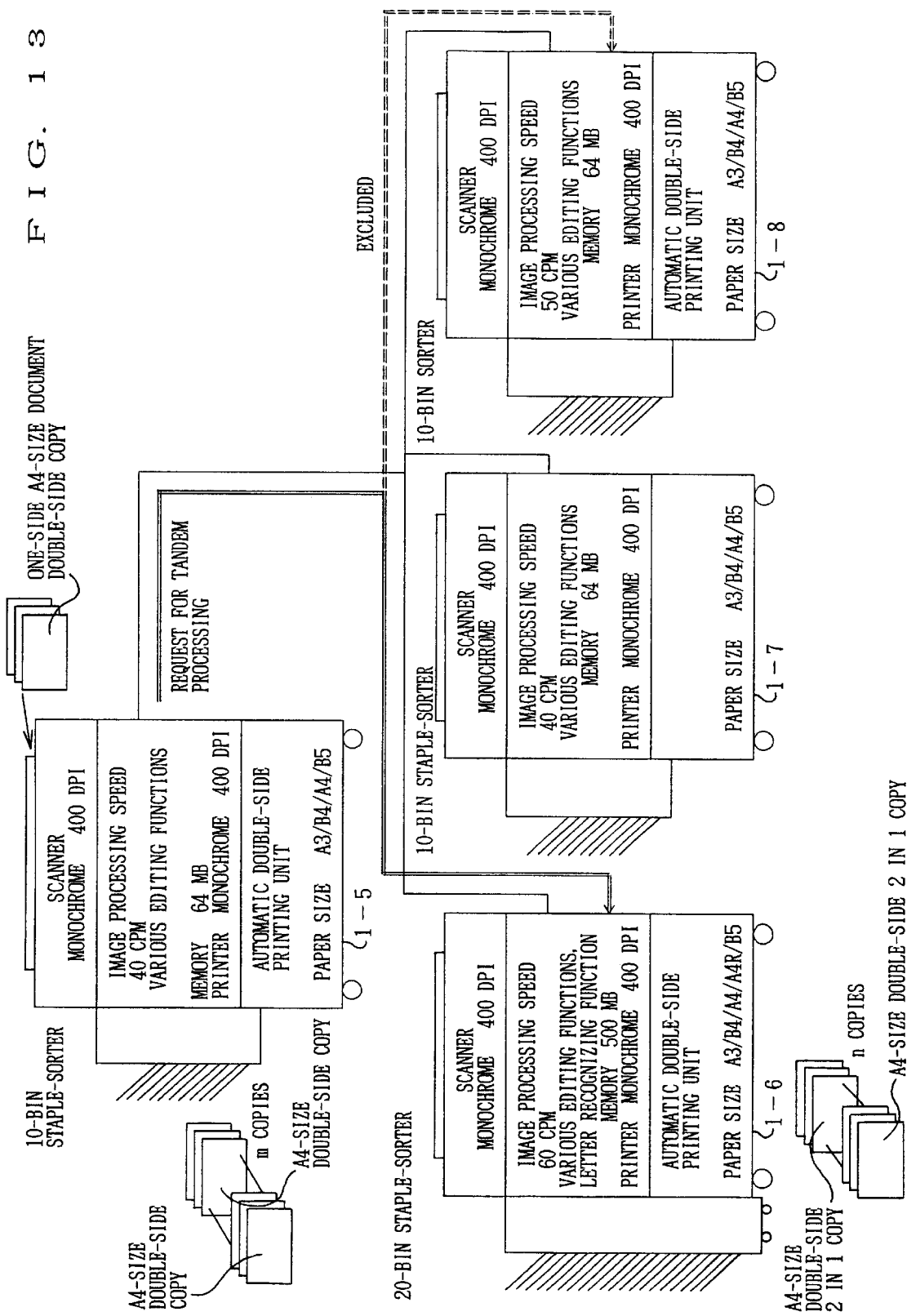
FIG. 13 is a view for explaining the control flowchart shown in FIG. 12 in more detail, the view illustrating an example case where some of the image forming devices are selected so as to actually perform the allocation processing operation, in the image forming system in accordance with the present invention.

The following description will explain the foregoing operation in more detail, referring to FIG. 13. In the image forming system shown in FIG. 13, a digital copying machine 1-5 which is an allocating copying machine sets conditions, and selects copying machines whose function setups match the conditions, as the destination machines available for the allocation processing operation. Here, in the case where digital copying machines 1-6 and 1-8 are selected as the destination machines available for the allocation processing operation, the digital copying machines 1-6 and 1-8 are displayed by the LCD device 61 of the digital copying machine 1-5. According to the display, the operator selects copying machines which are convenient for the operator. For example, if the digital copying machine 1-8 is placed at a remote location from the digital copying machine 1-5, the operator can exclude it as a copying machine unsuitable for the allocation processing operation from a viewpoint of processing efficiency, and can select only the copying machine 1-6 as the destination machine to be used for the allocation processing operation.

In the case where the digital copying machine 1-6 has functions shown in Table 1 in particular, double-side 2 in 1 copy can be performed regarding a set number (for example, n (n<m)) of copies processed by the selected digital copying machine 1-6 out of the number (m) of copies inputted by the allocating machine 1-5. In other words, even though an output in a manner desired by the operator requires processing operations by functions which the allocating digital copying machine 1-5 does not have, the hard copies can be easily and desirably obtained by, for example, fully utilizing the functions of the digital copying machine 1-6.

(Example 3)

The following description will explain an example wherein processing and outputting an additional document by allocating is requested during or immediately after an outputting operation through the allocation processing operation. In the case where the processing operation by allocation is requested to treat an additional document, it is necessarily found that conditions of the operation with respect to the additional document agree with the conditions for the previous processing operation, when such agreement is checked at the step S20 of the flow of FIG. 1. In other words, in the case where the conditions are not changed, the conditions for the two operations agree with each other (the flow proceeds from the step S20 to the step S34).

In this case, the destination machines have been already selected, and a command is sent to the destination machines used for the allocation processing operation (S34) so that whether or not the destination machines continuously remain available for the allocation processing operation is checked. Then, commands regarding whether or not they are available are returned from the destination machines (S35). The destination machine list is renewed (S36) based on the commands from the destination machines which have been received at the step S35, and if any destination machine is available for the allocation processing operation, the number of copies to be produced through the allocation processing operation by the destination machine is set, and the operation is commenced (S37→S38→the process ensuing the step S5 of FIG. 2).

By the above processing operation, whether or not the destination machines are in a state of being available for the allocation processing operation is immediately checked without performing a process through the steps 21 to S23 of FIG. 1, and if they are available, the outputting operation is performed. Therefore, the processing efficiency is enhanced.

(Allocation of Copies to be Produced)

Furthermore, in order to more efficiently produce a set number of copies by allocating the output job, the number being inputted through the allocating copying machine, the job for producing the set number of copies are allocated to the destination machines by setting each number of copies to be produced by each destination machine and sending the information to the destination machines respectively. The setting of each number of copies to be produced is performed by referring to a capacity and the like of each copying machine. By doing so, the allocating machine and the destination machines coincidentally finish the processing operation, whereby the processing efficiency is improved.

Figure 14:
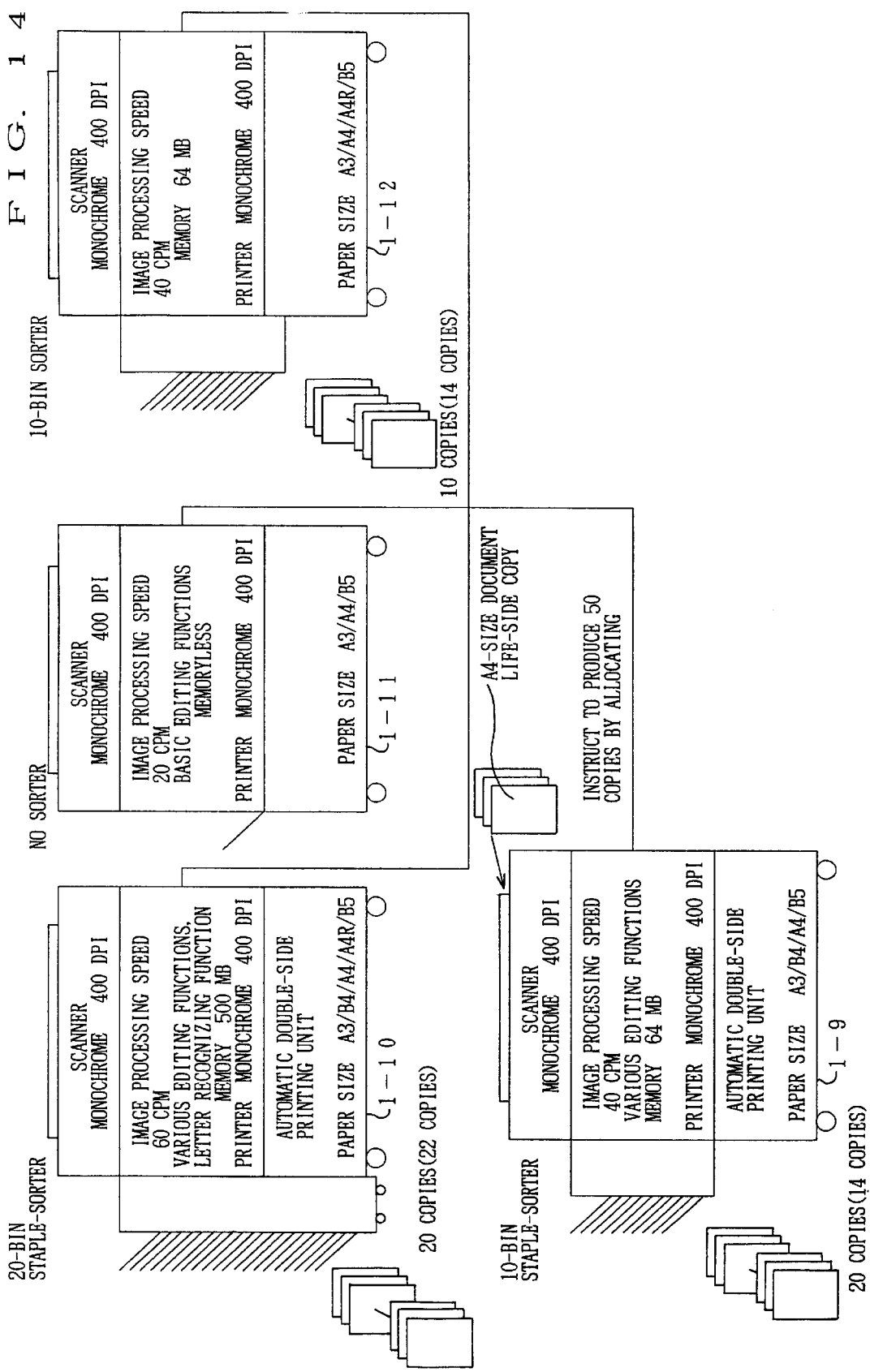
FIG. 14 is a view illustrating a view explaining an operation of allocating a job of producing a necessary number of copies to the image forming devices of the image forming system of the present invention.
Figure 15:
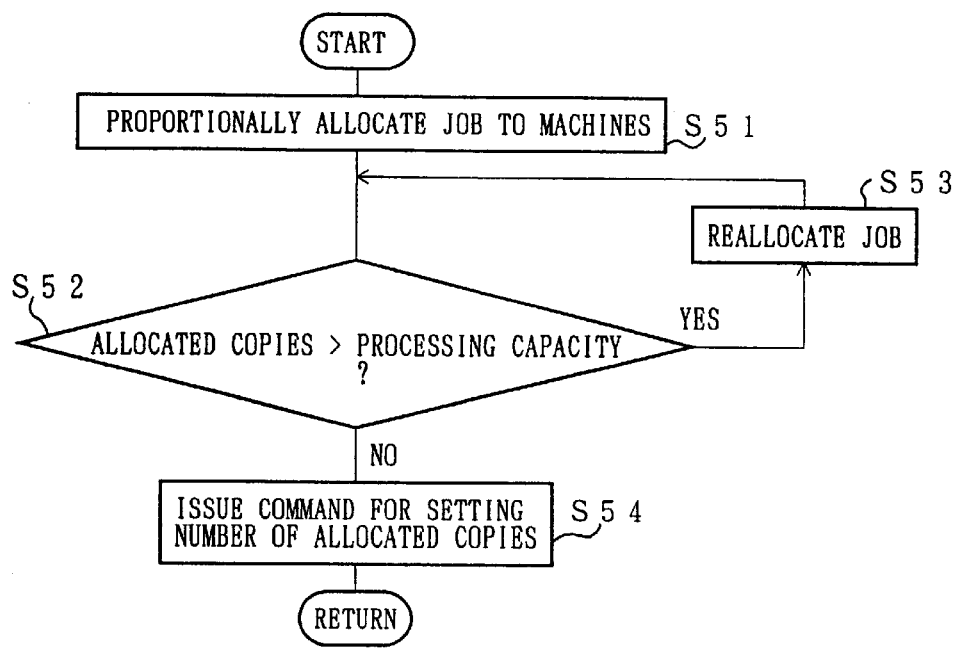
FIG. 15 is a flowchart illustrating allocation control in the image forming system shown in FIG. 14, regarding determination of a number of copies to produce.

Here, the following description will explain in more detail the setting of the number of copies to be produced by each copying machine, which is performed at the step S38 of FIG. 1, while referring to FIGS. 14 and 15.

First of all, referring to the outputting capacity of each copying machine, the number (m) of copies to be produced, the number being inputted by using the allocating machine, is allocated in proportion to the capacities of the copying machines (S51). For example, assume that according to FIG. 14, a digital copying machine 1-9 is used as the allocating machine, while digital copying machines 1-10 and 1-12 are selected as the destination machines available for the allocation processing operation. Besides, assume that, as shown in FIG. 14, the allocating machine 1-9 has an outputting capacity of producing 40 A4-size hard copies per one minute, while the digital copying machines 1-10 and 1-12 as the destination machines have capacities of producing 60 and 40, respectively.

Here, in the case where the set number (m) of copies to be produced, the number being inputted by using the allocating machine 1-9, is 140, the outputting job is allocated at the step S51 of FIG. 15 to the allocating machine 1-9 and the destination machines 1-10 and 1-12 so as to produce 40 copies, 60 copies and 40 copies, respectively.

Thereafter, in the case where the job as the number of copies allocated to each copying machine does not exceed the capacity of each copying machine regarding not only the image processing but also other matters, the allocating digital copying machine 1-9 sends the information about the numbers of copies to be produced, that is, 60 and 40, to the destination digital copying machines 1-10 and 1-12, respectively (S54). By doing so, all the copying machines to perform the allocation processing operation are made to coincidentally finish the outputting operation.

Note that the following problems may occur in the case where the allocation is carried out in proportion to the image processing capacities of the copying machines. Namely, in the case where using the post-processing unit 43 such as a sorter provided in the copying machine is scheduled, the sorter also has a limit on the number of copies to be treated. If the number of copies exceeding the limit of the sorter's capacity is allocated to the copying machine, the burden borne by the operator may increase.

For example, as shown in FIG. 14, in the case where the number of the copies in total to be outputted is set to 50 and the sorting is selected by using the allocating digital copying machine 1-9, the digital copying machines 1-10 and 1-12 are selected as the destination machines available for the allocation processing operation. The outputting job is allocated at the step S51 to the copying machines including the digital copying machines 1-10 and 1-12 thus selected, thereby resulting in that 22 copies, 14 copies, and 14 copies are allocated to the destination digital copying machines 1-10 and 1-12 and the allocating digital copying machine 1-9, respectively. However, since the allocating digital copying machine 1-9 and the destination digital copying machine 1-12 have a 10-bin sorter each while the destination digital copying machine 1-10 has a 20-bin sorter, the allocation exceeds capacity as to each of the copying machines.

In the case where the allocation exceeds capacity regarding not the image processing but other matters, as described above, re-allocation of the number of copies to be produced is performed (S52→S53). In the aforementioned example, the number of copies to be produced by the digital copying machine 1-12 is changed to 10. The number of copies to be produced by the digital copying machine 1-10 is changed to 20. Then, the rest is allocated to the allocating machine, whereby the number of copies allocated to the allocating digital copying machine 1-9 becomes 20.

In this case, the number of copies allocated to the allocating digital copying machine 1-9 exceeds the capacity thereof by 10 copies, thereby resulting in that the sorting cannot be performed with respect to the 10 copies. However, since in this case the operator him/herself sorts out the 10 copies at the allocating digital copying machine 1-9, the processing efficiency is enhanced, compared with the operator goes to the destination digital copying machine to perform the sorting operation. Thus, the functions of the destination copying machines are fully utilized, thereby remarkably enhancing the processing efficiency.

So far, various examples of the present invention have been described. The image forming device, however, should not be limited to the electrophotographic digital copying machine. Needless to say, the present invention is applicable to an image forming device equipped with a printer (image forming section) utilizing a thermal scheme or an ink-jet scheme.

As has been so far described, the image forming system of the present invention is characterized in comprising an allocating machine which an operator directly utilizes to set various conditions, and a plurality of destination machines connected with the allocating machine through communication means, wherein the allocating machine includes control means for searching the destination machines for any one capable of outputting in accordance with previously set conditions for outputting, allocating an outputting job and transferring image data to the destination machine thus searched out so as to cause them to perform the allocated outputting job.

Since in the case where a large number of copies are to be produced, the foregoing system is capable of completing an outputting job by allocating it to the image forming devices connected through communication means, an outputting time is shortened.

Here, the operator desirably sets conditions for outputting, including not only the number of copies to be produced but also formats outputted, by utilizing the allocating machine the operator directly uses. For example, the operator sets a magnification rate, image editing conditions, and the like. The allocating machine searches a plurality of the image forming devices interconnected for those capable of outputting in accordance with the set conditions, and transfers image data to the image forming devices thus searched out.

By doing so, output the operator desires can be obtained from the destination machines to which the outputting job is allocated, and output the operator does not desire never occurs. Besides, since the operator merely sets the conditions in order to obtain desired output, the burden borne by the operator decreases.

The processing efficiency is further enhanced by arranging the image forming system so that the control means further selects any one which provides a higher image data transferring efficiency than the others from among the searched-out destination machines. Particularly, the efficiency in the transfer of image data by the allocating machine is improved, whereby the output processing time is reduced. For example, in the case where the image data can be transferred in a code form, the image forming device capable of the code processing is prioritized. Or, from another viewpoint for transfer efficiency enhancement, the selection of the image forming device is performed.

By doing so, the transfer load on the allocating machine is reduced, whereby the transfer time decreases, resulting in that the processing efficiency is improved.

Furthermore, the control means preferably selects any ones from among the selected destination machines, so that the image data are transferred from the allocating machine by a single transfer scheme to the destination machines thus selected.

By doing so, the transfer of image data no longer has to be conducted in schemes respectively suitable for the image forming devices used for the allocation processing operation. In other words, since it is possible to transfer the image data in a single common transfer scheme, the load on the allocating machine is drastically reduced, thereby enhancing the processing efficiency.

Furthermore, (1) the control means preferably considers outputting capacities of the allocating machine and the destination machine searched out as an image forming device capable of outputting in accordance with the set conditions, and allocates a total number of copies to be produced between the allocating machine and the searched-out destination machine in proportion to the outputting capacities thereof, the total number being inputted by using the allocating machine, and (2) in case a number of copies allocated to the destination machine exceeds the outputting capacity of the searched-out destination machine, the control means re-allocates the total number of copies so that a number of copies re-allocated to the destination machine does not exceed the outputting capacity thereof and rest is re-allocated to the allocating machine.

With this arrangement, it is possible to save the time and labor of the operator for going to the destination machines and re-arranging the copies produced by the destination machines. In other words, since re-arrangement is performed only at the allocating machine, the burden on the operator is reduced, whereby the processing efficiency is further enhanced.

Another image forming system of the present invention is characterized in comprising an allocating machine which an operator directly uses and a plurality of destination machines connected with each other and the allocating machines so that an outputting job is allocated to the first and destination machines thus connected, the first and destination machines being capable of reproducing image data on sheets as hard copies in accordance with set conditions, the allocating machine including control means for searching the destination machines and selecting any ones capable of outputting in accordance with previously set conditions for outputting, allocating an outputting job, and transferring image data to the destination machines thus selected so as to cause them to perform the allocated outputting job, wherein the control means causes information about the selected destination machines to be displayed, and allows the operator to arbitrarily select any ones to be used for performing the outputting operation from among the selected destination machines, referring to the displayed information.

With the foregoing image forming system, the processing efficiency is further enhanced since the operator is allowed to select image forming devices which are the most convenient for the operator. For example, in the case where the destination machines selected by the control means include one placed at a remote location from the allocating machine, the operator can exclude the destination machine at the remote location from a list of the selected destination machines. By doing so, the operator does not have to go to a remote location to fetch the hard copies.

Furthermore, in the case where the selected destination machines have image processing functions the operator further desires, the operator is allowed to further requests image processing by such functions. In other words, the image processing functions of the selected image forming devices can be fully utilized, whereby an output in a format the operator further desires can be achieved.

Still another image forming system of the present invention is characterized in comprising an allocating machine which an operator directly uses and a plurality of destination machines connected with each other and the allocating machines so that an outputting job is allocated to the first and destination machines thus connected, the first and destination machines being capable of reproducing image data on sheets as hard copies in accordance with set conditions, the allocating machine having control means for searching the destination machines and selecting any ones capable of outputting in accordance with previously set conditions for outputting, allocating an outputting job, and transferring image data to the destination machines thus selected so as to cause them to perform the allocated outputting job, wherein in case additional image data are inputted during performing the allocated outputting job or immediately after finishing the same, the control means transfers the additional image data to the image forming devices performing or finishing the allocated outputting job, without performing the searching operation.

With the foregoing image forming system, the processing efficiency is further enhanced, since the image forming devices which have perform an outputting operation can be made to remain in use, to output the additional image data. Besides, there is no burden on the operator, since just an instruction for the additional processing is required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming system comprising:
   a first image forming device which an operator uses to set various conditions, said first image forming device defining image output means;
   a plurality of second image forming devices each defining a separate image output means, and each being connected to said first image forming device through communication means; and
   at least one post processing device associated respectively with the image output means of said first image forming device and/or at least one of said plurality of second image forming devices and connected to said first image forming device by said communication means; wherein:

said first image forming device includes control means (i) for searching said plurality of second image forming devices and the post processing device as may be associated therewith, (ii) for allocating an output capacity to each of said plurality of second image forming devices having a post processing device associated therewith such that the image output means of each of said plurality of second image forming devices is set to be equal to the output capacity of the associated post processing device, (iii) for selecting all of said image forming devices capable of, or having an allocated capability of, outputting in accordance with previously set conditions for outputting, (iv) for prioritizing among said selected image forming devices according to a predetermined criteria, (v) for allocating an outputting job to at least one of said selected image forming devices such that said outputting job will be performed most efficiently and/or conveniently by those of said selected image forming devices having the highest available priorities, and (vi) transferring image data to said at least one of the plurality of second image forming devices having the outputting job allocated to it so as to cause said at least one of the plurality of second image forming devices to perform the allocated outputting job.

2. The image forming system as set forth in claim 1, wherein, said predetermined criteria are based at least partially upon a efficiency of the transfer of image data between said first image forming device and individual ones of said plurality of second image forming devices.

3. The image forming system as set forth in claim 2, wherein said predetermined criteria are based further at least partially upon the capability of transferring data by a single scheme from said first image forming device to individual ones of said plurality of second image forming devices.

4. The image forming system according to claim 1, wherein:

when additional image data and/or a new outputting job is inputted into said system during performance of an ongoing allocated outputting job or immediately after finishing the allocated outputting job, and said additional image data and/or said new outputting job is subject to the predetermined criteria of said allocated outputting job, said system further includes means for directing said control means to omit said searching.

* * * * *